United States Patent
Yokote et al.

(10) Patent No.: US 9,117,014 B2
(45) Date of Patent: Aug. 25, 2015

(54) DATABASE SYSTEM AND CONTROL METHOD THEREFOR

(71) Applicants: Yasuhiko Yokote, Tokyo (JP); Symphony Co., Ltd., Tokyo (JP)

(72) Inventors: Yasuhiko Yokote, Tokyo (JP); Nagayama Tatsumi, Tokyo (JP)

(73) Assignees: Yasuhiko Yokote, Tokyo (JP); Symphony Co. Ltd, Tokyo (JP)

( * ) Notice: Subject to any disclaimer, the term of this patent is extended or adjusted under 35 U.S.C. 154(b) by 0 days.

(21) Appl. No.: 14/346,464

(22) PCT Filed: Nov. 13, 2012

(86) PCT No.: PCT/JP2012/079353
§ 371 (c)(1),
(2) Date: Mar. 21, 2014

(87) PCT Pub. No.: WO2014/076751
PCT Pub. Date: May 22, 2014

(65) Prior Publication Data
US 2014/0208168 A1     Jul. 24, 2014

(51) Int. Cl.
*G06F 11/00* (2006.01)
*G06F 11/34* (2006.01)
*G06F 9/44* (2006.01)
*G06Q 10/06* (2012.01)
*G06Q 10/10* (2012.01)
*G06Q 50/18* (2012.01)

(52) U.S. Cl.
CPC ............. *G06F 11/3447* (2013.01); *G06F 8/20* (2013.01); *G06Q 10/06* (2013.01); *G06Q 10/10* (2013.01); *G06Q 50/18* (2013.01)

(58) Field of Classification Search
CPC ............ G06F 11/3447; G06F 11/1402; G06F 11/1008
See application file for complete search history.

(56) References Cited

U.S. PATENT DOCUMENTS

2006/0004548 A1* 1/2006 Santos et al. .............. 703/1
2013/0297972 A1* 11/2013 Yokote et al. .............. 714/15
2014/0157235 A1* 6/2014 Bird et al. ................. 717/121

FOREIGN PATENT DOCUMENTS

JP   2012-113614    6/2012
WO  2012/073686    6/2012

OTHER PUBLICATIONS

Nakazawa et al.; "A Monitoring Mechanism for Ubiquitous Sensor Networks Using D-Case", The Institute of Electronics, Information and Communication Engineers, IEICE Technical Report USN2011-78, Jan. 2012, pp. 123-128.
Avizienis et al.; "Basic Concepts and Taxonomy of Dependable and Secure Computing", IEEE Transactions on Dependable and Secure Computing, vol. 1, No. 1, Jan.-Mar. 2004, pp. 11-33.
Mario Tokoro: "Open Systems Dependability—Dependability Engineering for Ever-Changing Systems", ISBN: 978-1-4665-7751-0, CRC Press, 2012, entire document.
"D-Case Guide", ISBN: 978-4-8629-3079-8, Daitec Holding Co., Ltd., 2012, entire document.

* cited by examiner

*Primary Examiner* — Yolanda L Wilson
(74) *Attorney, Agent, or Firm* — Whitham Curtis Christofferson & Cook, PC

(57) ABSTRACT

In an open environment, a consensus building means for maintaining dependability throughout the entire life cycle of a target system between stakeholders is provided, thereby appropriately operating the target system in accordance with the content of an agreement between the stakeholders.
A consensus building support tool provides a support for consensus building through an argument regarding an ordinary operation state of a target system. History obtained in the process of the consensus building is recorded in a database layer as an agreement graph. A monitoring node tool detects deviation from the ordinary operation state of the target system based on an actual operation state of the target system and the agreement graph. A contract generating tool extracts information data regarding the consensus building from the agreement graph when the deviation from the ordinary operation state is detected in the target system.

5 Claims, 21 Drawing Sheets

DATABASE SYSTEM AND CONTROL METHOD THEREFOR

TECHNICAL FIELD

The present invention relates to a database system. More particularly, the present invention relates to a database system and a control method for the same to maintain dependability of a target system.

BACKGROUND ART

Information (IT) systems are required to continuously make available services that the systems provide without anxiety. The information systems substantially increase in scale and take a very important role as social infrastructure, so that, once an accident occurs, the whole nation, or in some cases throughout the world, is affected by it. There is a case where a serious failure is caused in banking systems, communication systems, railway systems, and cloud systems, which leads to a huge amount of compensation. Stakeholders bear in mind that, if a large accident occurs, liabilities are pursued, and if negligence is admitted, a harsh penalty is imposed.

With regards to reliability, availability, maintainability, safety, completeness, and confidentiality of computer systems, dependability has been discussed for a long time as properties that computers need to include (for example, see Non Patent Literature 1). In the development of embedded systems, a technique has been applied wherein a development project is drawn up at first, and functional requirements and non-functional requirements for target systems and services are established as a specification, and verifications and tests are conducted over a long period of time and deployed. However, the number of failures has been increased day by day. In the standards such as CMMI and ISO 26262, they have been attempted to reduce human errors. However, these existing technologies and standards lack consideration for the characteristics of the systems in the open environment.

Accordingly, Japan Science and Technology Agency (IST), which is an independent administrative institution, started the DEOS project as one of CREST programs in 2006, which is aimed at consolidating, institutionalizing, and further commercializing a system of techniques that guarantee the dependability of information systems. If this system of techniques is expressed in a word, it can be described as a system of techniques in which the safety standard of systems is defined, and when the safety standard of systems is deviated, abnormal situations are avoided before running into abnormal situations, or even when the system is run into abnormal situations, immediate recovery can be applied, which the inventors and the like define as open system dependability (Open Systems Dependability).

This open system dependability is classified in view of process and consolidated as DEOS process (for example, see Non Patent Literature 2 and Patent Literature 1). If the characteristics of the DEOS process is expressed in a word, it can be described as a process that regulates the behavior of persons and objects according to the target systems in order to guarantee the open system dependability according to the entire life cycle regarding the target system ranging from planning and designing on the upstream to operations, which maintains the normal operational states of the target system with agreements with regards to every argument as a base, which includes an agreement with regards to requirements for the target system from persons (stakeholders) who engage in the target system. D-Case is designed as a common language between respective processes (for example, see Non Patent Literature 3).

CITATION LIST

Patent Literature

PTL 1: WO 2012/073686

Non Patent Literature

NPL 1: Algirdas Avizienis, et. al. : "Basic Concepts and Taxonomy of Dependable and Secure Computing", IEEE Transactions on Dependable and Secure Computing, vol. 1, no. 1, p. 11-33 (2004)

NPL 2: Mario Tokoro: "Open Systems Dependability—Dependability Engineering for Ever-Changing Systems", ISBN: 978-1-4665-7751-0, CRC Press (2012)

NPL 3: "D-Case Guide", ISBN: 978-4-8629-3079-8, Daitec Holding Co., Ltd. (2012)

SUMMARY OF INVENTION

Technical Problem

The expansion of a system scale and an increase in complexity lead to complication of the specification regarding the system and services provided by the system and make it impossible to fully describe all the specifications prior to the development of the system (incompleteness of specification). This incompleteness of the specifications leads to the incompleteness of corresponding implementation, and the behavior of the services provided by the system cannot completely be grasped, which causes the difficulty of grasping what is guaranteed, or to what extent it is possible to demand a guarantee. Similarly, this incompleteness leads to a difference (misunderstanding) in understanding the requirements for the systems and services among the stakeholders and also induces human errors.

Furthermore, a request corresponding to change in the environment surrounding the system is newly generated. Also, it is necessary to correct the requirement at the time of development. Because the change in the environment cannot be known in advance, it is impossible to know whether the change in the environment is securely handled based on the operation of the present system. The uncertainty for this change makes it difficult to predict the system operation, and when the system handles the change, it is most likely that a system failure occurs.

In the above-described Non Patent Literature 2 and Patent Literature 1, D-Case is introduced as common expression form between a process corresponding to objectives and changes in the environment (change accommodation cycle) and a process which is activated when the indication of failure is detected, or when the failure occurs (failure response cycle). The failure response that is assumed at the time of development is described as the D-Case, and an agreement is made among the stakeholders, thereby making it possible to achieve the accountability for the stakeholders at the time of occurrence of the failure. However, the D-Case agreed among the stakeholders is the agreement for the whole description, so that the D-Case is complicated along with the expansion of a system scale, and it takes a long period of time during which the agreement is concluded.

The present invention has been achieved in view of the above circumstances to solve the technical problems, and in an open environment in which incompleteness and uncertainty latently exist, it is an object of the present invention to provide a consensus building means for maintaining dependability throughout the entire life cycle of a target system between stakeholders and a means for appropriately operating the target system in accordance with the content of an agreement between the stakeholders.

Solution to Problem

The present invention has been achieved in order to solve the above-described problems. According to the first aspect of the present invention, a database system may include a consensus building unit configured to provide a support for consensus building through an argument regarding an ordinary operation state of a target system, an agreement graph storing unit configured to store history obtained in a process of the consensus building as an agreement graph, a detecting unit configured to detect deviation from the ordinary operation state of the target system based on an actual operation state of the target system and the agreement graph, and an extracting unit configured to extract information data regarding the consensus building from the agreement graph when the deviation is detected in the target system. Accordingly, this performs the function of detecting the deviation from the ordinary operation state of the target system based on the agreement graph obtained in the process of the consensus building and extracting the necessary information data.

Also, according to the first aspect, it may be such that the consensus building unit generates the agreement graph as a base with a plurality of models that define the target system, and the respective plurality of models uniquely define a meaning of a word regarding the target system, uniquely define an effect of an operation regarding the target system, and uniquely correlate logical definition with physical definition of data regarding the target system. Accordingly, this performs the function of generating the agreement graph as a base with the plurality of models that define the target system.

Also, according to the first aspect, a document storing unit may be included that is configured to correlate and store the agreement graph and a document regarding the target system generated through action of a plurality of stakeholders at plural stages constituting a life cycle of the target system. Accordingly, this performs the function of correlating and storing the agreement graph and the document regarding the target system.

Also, according to the first aspect, it may be such that the agreement graph is accessed in bilateral cycles, which are made up of a change accommodation cycle for continuously changing the target system with respect to an objective of the target system or a change of an environment and a failure response cycle for handling a failure in the target system. Accordingly, this performs the function of utilizing the agreement graph in the change accommodation cycle and the failure response cycle.

Also, according to the second aspect of the present invention, a database system control method may include a consensus building procedure configured to provide a support for consensus building through an argument regarding an ordinary operation state of a target system, an agreement graph storing procedure configured to store history obtained in a process of the consensus building as an agreement graph, a detecting procedure configured to detect deviation from the ordinary operation state of the target system based on an actual operation state of the target system and the agreement graph, and an extracting procedure configured to extract information data regarding the consensus building from the agreement graph when the deviation is detected in the target system. Accordingly, this performs the function of recording the agreement graph obtained in the process of the consensus building in the database system, detecting the deviation from the ordinary operation state of the target system based on the agreement graph, and extracting the necessary information data.

Advantageous Effects of Invention

According to the present invention, advantageous effects can be achieved in such a manner that, in an open environment in which incompleteness and uncertainty latently exist, there are provided a consensus building means for maintaining dependability throughout the entire life cycle of a target system between stakeholders and a means for appropriately operating the target system in accordance with the content of an agreement between the stakeholders. In particular, it is possible to appropriately operate DEOS process, thereby achieving the effect of maintaining the open system dependability regarding the target system.

Furthermore, with respect to the reduction of the dependability that is the most problematic factor in a case where the target system is changed due to the change in the environment that surrounds the target system or change in the objectives of businesses and the like, there provided advantageous effects of achieving the accountability of the stakeholders and maintaining the open-system dependability by removing a barrier between the conventional development phase and operational phase and closely combining the development phase and operational phase through the agreement graph.

DESCRIPTION OF EMBODIMENTS

Hereinafter, the embodiments to carry out the present invention will be described in detail.

<DEOS Process>

Figure 1:
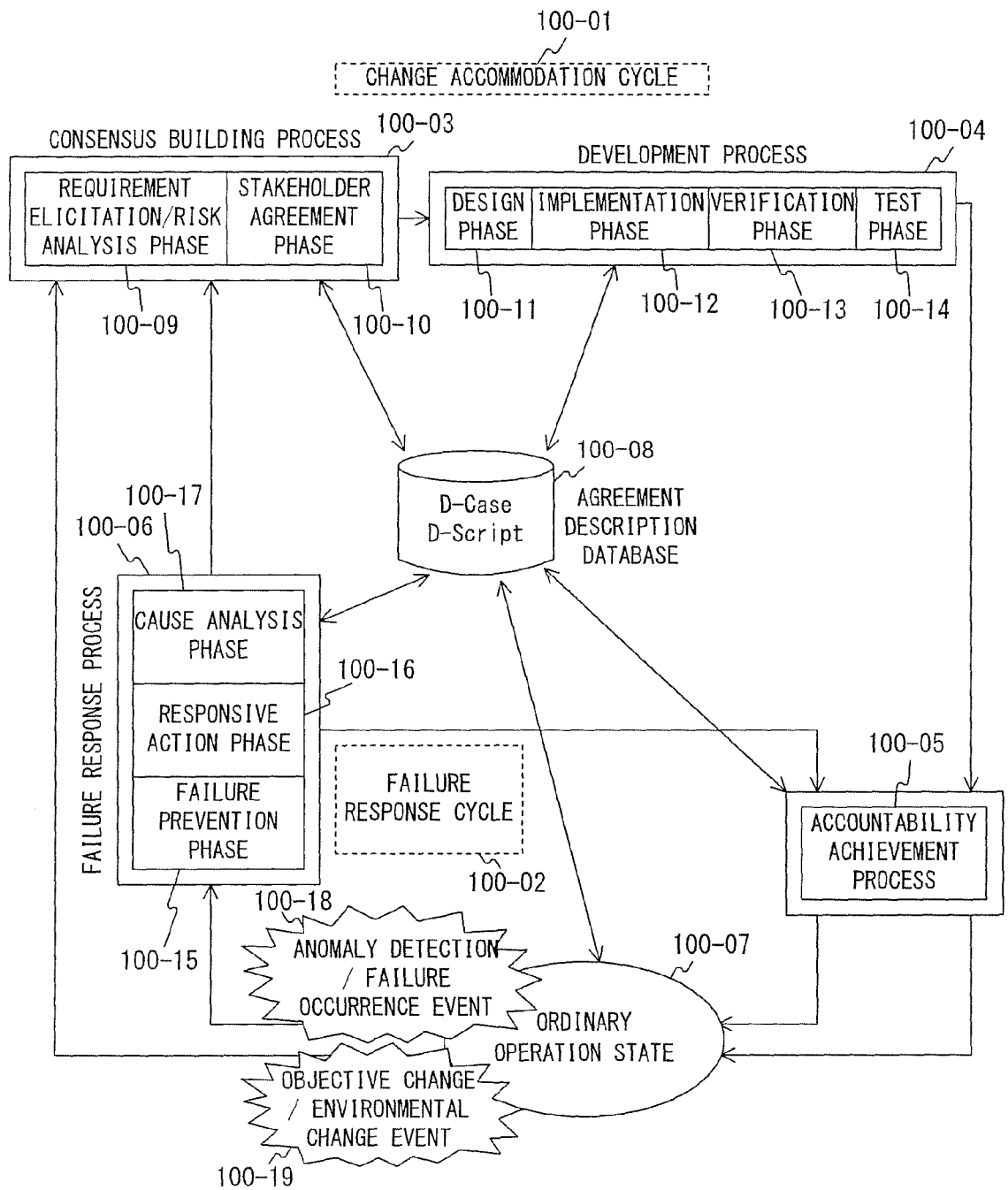
FIG. 1 is a diagram illustrating the outline of DEOS process assumed in the embodiment of the present invention.

FIG. 1 is a diagram illustrating the outline of DEOS process assumed in the embodiment of the present invention. It is essential to have an approach as an iterative process in order to realize open system dependability, that is, dependability for the system in which functions, structures, and system boundaries are continuously changed with a lapse of time. The iterative process is required to include a cycle (change accommodation cycle 100-01) in which the system is continuously modified corresponding to the objectives (Objectives) and change in the environment, and a cycle (failure response cycle 100-02) that is aimed at swiftly responding with failures. In both cycles, an agreement description database 100-08 is referred to or modified.

The change accommodation cycle 100-01 is a cycle made up of processes that are required to guarantee the open system dependability of a target system on an upstream process. The change accommodation cycle 100-01 defines three processes, which are a consensus building process 100-03, a development process 100-04, and an accountability achievement process 100-05.

The failure response cycle 100-02 is a cycle made up of processes that are required at the time of operating the target system. The failure response cycle 100-02 defines two processes, which are a failure response process 100-06 and the accountability achievement process 100-05. Normally, in both cycles, the target system is maintained in an ordinary operation state 100-07.

Interested persons regarding the dependability of the target system are referred to as "stakeholders" in the DEOS process. It is assumed that the stakeholders include 1) users of services and products (clients, the whole society in the case of social infrastructure), 2) providers (business owner) of services and products, 3) system providers (design/development engineers, maintenance operators, and hardware suppliers), 4) authorizers of services and products (regulatory authorities) and the like, but not limited thereto.

There is a possibility that the stakeholders change each objective due to a lapse of time or changes in the environment, thereby changing the requirements for functions and services. Herein, the changes are referred to as "objective change/environmental change". In response to the changes, the stakeholders take the consideration and request the change in the system at an appropriate time, based on mutual agreements therebetween. The DEOS process includes the above-described change accommodation cycle 100-01 as a cycle in response to the requirement.

The target system has an extreme difficulty of fully avoiding failures that are attributed to incompleteness and uncertainty. When the indication of a failure is detected, the failure is avoided beforehand, but unfortunately, when the failure occurs, it is necessary to swiftly handle the failure, minimize the damage, investigate the cause, and fulfill accountability. The DEOS process includes the above-described failure response cycle 100-02 in order to handle the situation.

The consensus building process 100-03 is constituted by a requirement elicitation/risk analysis phase 100-09 and a stakeholder agreement phase 100-10. The consensus building process 100-03 is activated by an objective change/environmental change event 100-19 or activated based on the result of the failure response process 100-06.

In the requirement elicitation/risk analysis phase 100-09, the requirements according to the target system are elicited from users' demands, stakeholders' objectives, various system environments, regulations, and the like. Similarly, at the same time, the scenario of service continuation is developed. The result of the requirement elicitation/risk analysis phase 100-09 is a series of dependability requirements.

The stakeholder agreement phase 100-10 starts arguments regarding what to change, why to change, and where to change, in the target system by a plurality of stakeholders. The process of the argument and an agreement as its result are logically described as a later-described D-Case. The stakeholder agreement phase 100-10 generates an executable procedure from the scenario of the service continuation. The executable procedure is described in D-Script and used for the failure response.

The development process 100-04 is constituted by a design phase 100-11, an implementation phase 100-12, a verification phase 100-13, and a test phase 100-14.

In the design phase 100-11, a requirement, which is agreed as the result of the consensus building process 100-03 at a preceding stage, is discussed, for example, as to where to implement and how to operate the target system and consolidated in a necessary specification.

In the implementation phase 100-12, a necessary program code is described from the specification of the design phase 100-11, or a program code that realizes a necessary technology is obtained, thereby performing the construction of systems required for operations and the like.

In the verification phase 100-13, it is verified whether the result of the implementation phase 100-12 is not incongruous with the result of the consensus building process 100-03. The logical consistency of programs and the contradiction of programming language are verified.

In the test phase 100-14, it is verified whether the target system is operated in accordance with the agreement of the stakeholders in the consensus building process 100-03 according to benchmarks and fault tolerance tests for performance verification.

The failure response process 100-06 is activated from the ordinary operation state 100-07 and constituted by a failure prevention phase 100-15, a responsive action phase 100-16, and a cause analysis phase 100-17.

The failure prevention phase 100-15 is activated, in particular, based on the detection of the indication by an anomaly detection/failure occurrence event 100-18. When the indication of the failure is detected, a necessary measure to avoid the failure is executed. There is a case where the measure is executed by the execution of the above-described executable procedure (D-Script), and there is a case where the consensus building process 100-03 is activated by way of the requisite cause analysis phase 100-17, whereby the measure by the stakeholders is executed.

On the other hand, the responsive action phase 100-16 is activated, in particular, based on the occurrence of the failure in the anomaly detection/failure occurrence event 100-18, whereby the measure that restores the target system from the failure into the ordinary operation state 100-07 is executed. As is the same with the failure prevention phase 100-15, there is a case where the measure is executed through the execution of the executable procedure (D-Script), and there is a case where the consensus building process 100-03 is activated by way of the requisite cause analysis phase 100-17, whereby the measure by the stakeholders is executed.

The ordinary operation state 100-07 indicates that the target system is in an ordinary operation state. The ordinary operation state 100-07 is a state where the target system does not substantially deviate from a service level variation tolerance range (In-Operation Range) that has been agreed among the stakeholders, and the services are continuously provided for users. It is desirable that the change accommodation cycle 100-01 is executed in parallel with the ordinary operation, and the change of the system is performed while the services are continuously provided. Similarly, it is desirable that the failure response cycle 100-02 is executed while the ordinary operation is continuously performed. In fact, there is a case where, even when the system detects the indication of abnormality, avoidance processing is automatically provided within the service level variation tolerance range, thereby continuously providing the service. Moreover, there is a case where part of the functions is reduced, and the service is continued. However, there is a case where providing the service is completely stopped.

The processes executed in the ordinary operation state 100-07 include the improvement activities of continuous dependability such as the inspection of everyday operation records, the periodical reconsideration or improvement for processes, and training, discipline, and education of personnel. There is a possibility that a person in charge of maintenance or operation records the operational states of the system and inspects them on a daily basis, thereby finding any indication based on the operational states. Similarly, putting the memory resource of the system in a clean state at all times is also very effective, usual maintenance or improvement activities. Moreover, it is also effective to positively have a rehearsal. Failure occurs when a certain period of time passes, and a certain state is reached. If so, the occurrence of the failure can be recognized in advance by allowing time to pass beforehand, which is so-called rehearsal. It depends on the situation at that time as to what extent an appropriate rehearsal can be performed during the operation of the services provided by the information system.

In the accountability achievement process 100-05, service providers, in particular, social infrastructure service providers and providers of products widely used in society explain failure status, swift accommodation, future outlook, and the like to the users of services, the users of the products, and the society at the time of occurrence of the failure. Also, when the system is changed in order to satisfy the stakeholders' demands for change, which is attributed to change in objectives and environments, the providers explain the circumstances and when and how the services and functions are improved (changed). When the explanation for the implementation status of daily services or a design development/maintenance operation process is required, the explanation is provided accordingly. This has a very important role in maintaining credibility from the users and society, creating consensus in terms of the provision of infrastructure services, and consequently, protecting conveniences in the course of carrying on the business of service providers.

<Dependability Maintenance Repository System>

Figure 2:
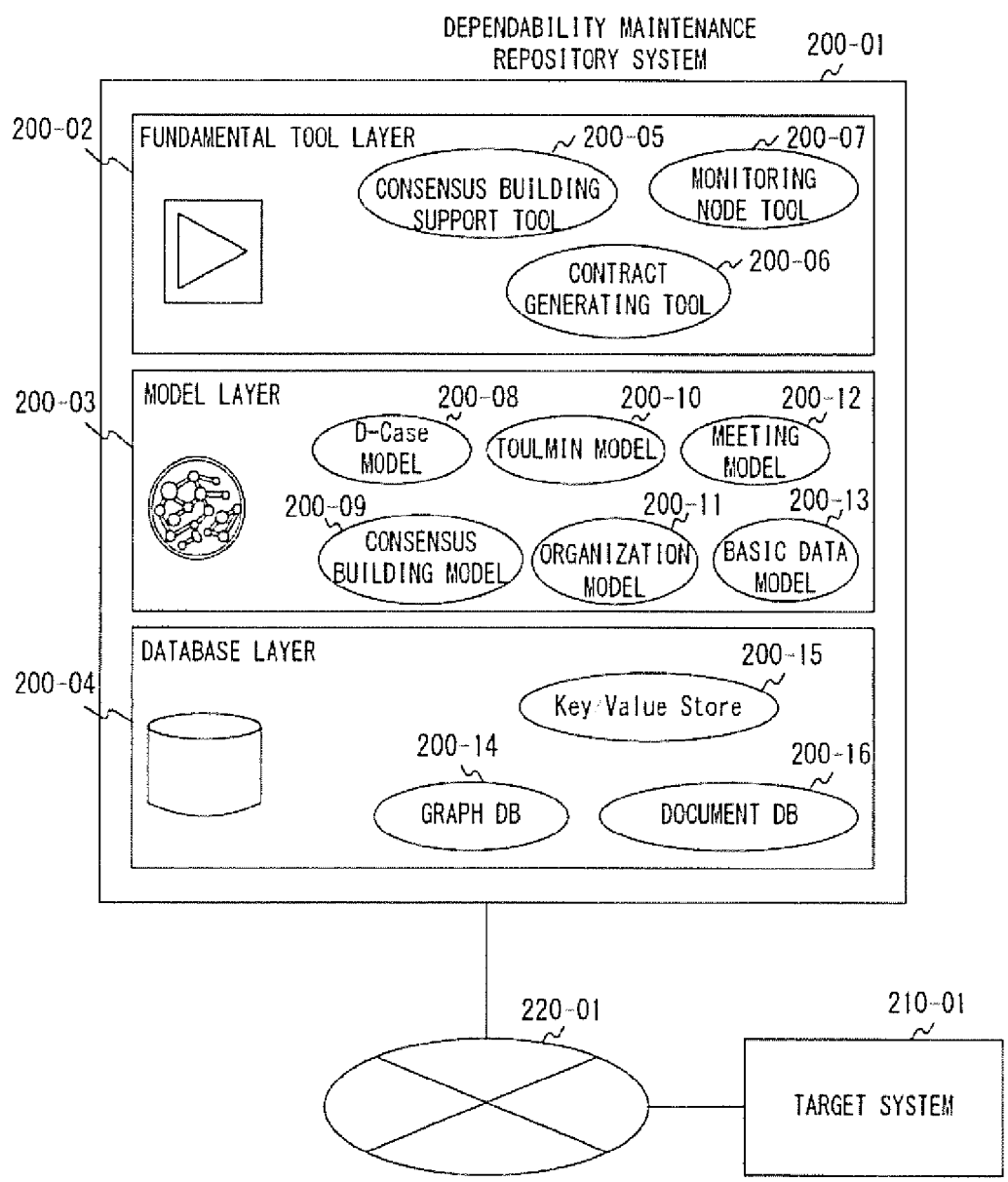
FIG. 2 is a functional block diagram illustrating the outline of the example of the constitution of a dependability maintenance repository system 200-01 according to the present embodiment.

FIG. 2 is a functional block diagram illustrating the outline of the example of the constitution of a dependability maintenance repository system 200-01 according to the present embodiment. This dependability maintenance repository system 200-01 corresponds to the agreement description database 100-08 in the DEOS process. It is noted that the dependability maintenance repository system 200-01 is one example of a database system described in the claims.

The dependability maintenance repository system 200-01 is connected via a target system 210-01 and a network 220-01. The target system 210-01 may be a system constituted by two sets or more of separate computers. When the target system 210-01 is constituted by two sets or more of separate computers, each computer can be connected to the network 220-01. The network 220-01 in the present embodiment may be a dedicated line or may be a public line that includes the Internet, and may be such that a virtual dedicated line is constructed by use of VPN technology on the public line, and may also be a communication line provided by OS in the inside of one set of computer. Hereinafter, the network is defined as is described above unless otherwise stated.

The dependability maintenance repository system 200-01 is constituted by three-layer structure made up of an upper layer, a middle layer, and a lower layer.

The upper layer is a fundamental tool layer 200-02, in which there exists a computer program that supports exchange between the dependability maintenance repository system 200-01 and each DEOS process. In the present embodiment, three tools, which include a consensus building support tool 200-05, a contract generating tool 200-06, a monitoring node tool 200-07, are exemplified as a basic tool but not limited thereto.

The consensus building support tool 200-05 facilitates the implementation of the consensus building process in the DEOS process. In the consensus building process of the DEOS process, an argument model proposed by Toulmin (Stephen E. Toulmin) is adopted (for example, see ISBN: 978-0-5215-3483-3). Documents generated in the course of reaching an agreement among the stakeholders are expressed by the argument model and recorded in the dependability maintenance repository system 200-01.

The contract generating tool 200-06 supports the writing of a necessary contract regarding the target system 210-01 based on the information recorded in the dependability maintenance repository system 200-01.

The monitoring node tool 200-07 is related to a D-Case monitor node (for example, see Non Patent Literature 3), which describes necessary information at the monitoring point of the target system, and provides necessary functions of monitoring the target system 210-01.

The middle layer is a model layer 200-03 and defines a model required in the fundamental tool layer 200-02, which is the upper layer. In the present embodiment, a basic data model 200-13, a consensus building model 200-09, a Toulmin model 200-10, a meeting model 200-12, a D-Case model 200-08, and an organization model 200-11 are exemplified, but not limited thereto, which are freely expandable or reduceable.

The basic data model 200-13 defines a model commonly used in the fundamental tool layer 200-02, which is the upper layer. The consensus building model 200-09 defines a model required in the consensus building support tool 200-05. The Toulmin model 200-10 defines a model that expresses the argument model of Toulmin. The meeting model 200-12 defines a model required in a case where the consensus building among the stakeholders is made in the form of meetings. The D-Case model 200-08 defines a model required to record D-Case description (for example, see Non Patent Literature 3). The organization model 200-11 defines a model required to correlate the authority of the stakeholders with an organization.

The lower layer is a database layer 200-04 and a database that records the instance (also referred to as model-type data) of the model defined by the model layer 200-03, which is the upper layer. In the present embodiment, three types, which include a graph DB 200-14, a document DB 200-16, and a Key/Value Store 200-15, are defined, but not limited thereto.

The graph DB 200-14 is mainly utilized to record the later-described agreement model. The document DB 200-16 is utilized to store necessary documents recorded in the dependability maintenance repository system 200-01. The Key/Value Store 200-15 is utilized to record indexes of the graph DB 200-14 and the document DB 200-16.

<Hardware Constitution>

Figure 3:
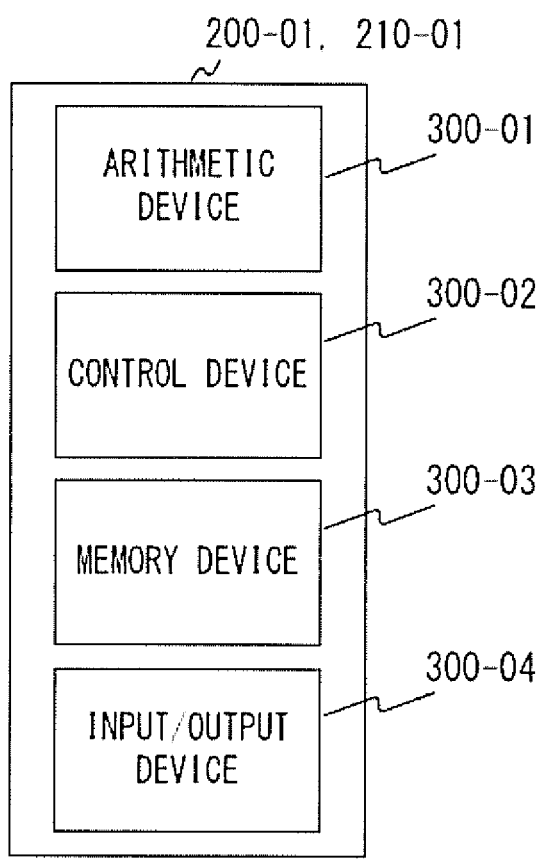
FIG. 3 is a diagram illustrating the example of the hardware constitution of the dependability maintenance repository system 200-01 and a target system 210-01 according to the present embodiment.

FIG. 3 is a diagram illustrating the example of the hardware constitution of the dependability maintenance repository system 200-01 and the target system 210-01 according to the present embodiment. As most basic constitution, the dependability maintenance repository system 200-01 and the target system 210-01 are an electronic calculator that includes an arithmetic device 300-01 connected to a command bus and a data bus, a control device 300-02, a memory device 300-03, and an input/output device 300-04.

Arithmetic computation, logical computation, comparison computation, and shift computation are executed in the arithmetic device 300-01 based on the information on bit data inputted from the input/output device 300-04. The data executed is stored in the memory device 300-03 and outputted to the input/output device 300-04 as needed. A series of processing is controlled by the control device 300-02 in accordance with software programs stored in the memory device 300-03. The dependability maintenance repository system 200-01 and the target system 210-01 according to the present embodiment are hardware that includes basic functions as the above-described computer and controlled by program groups such as operating systems, device drivers, middleware, and application software.

<Model and Agreement Graph>

Figure 4:
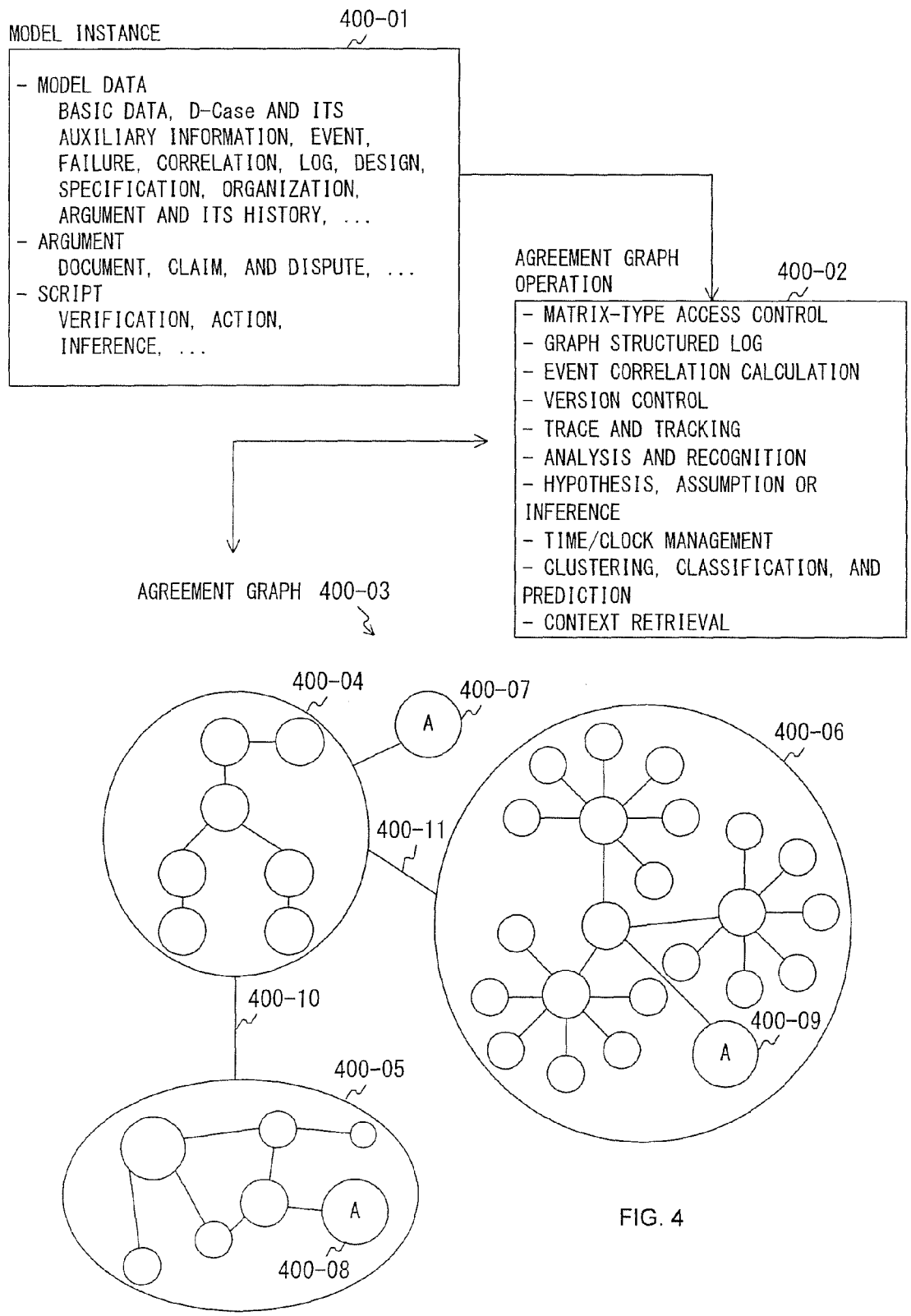
FIG. 4 is a diagram to describe a model in the present embodiment.

FIG. 4 is a diagram to describe the model in the present embodiment. The model is a defined domain in which the meaning of a word is uniquely defined, and the effect of an operation is uniquely defined, and logical definition and physical definition of data are uniquely correlated. The model is defined in the present embodiment as described above unless otherwise stated.

In the above-described model layer 200-03, six models are represented. Data that is generated on the base of these model groups is referred to as a model instance 400-01.

The model instance 400-01 has various document groups such as D-Case and its auxiliary information, specifications, design specifications, operation planning reports, and logs as instances according to model data. Instances according to the argument include a document group of minutes documents, documents regarding claim and dispute and their history and the like. Instances according to scripts include a document group regarding the procedures for verification, action, inference, and the like. In the document groups, all modified history is left. Furthermore, documents such as a script for verifying whether the target system is in the ordinary operation state 100-07 and a script for describing an action in a case where the target system stays out of the ordinary operation state 100-07 are also included as a target by examining a service level variation tolerance range (In-Operation Range), which is a parameter according to the target system agreed among the stakeholders.

The model instance 400-01 is recorded in the database layer 200-04. Three types of repository are provided that include a graph database 200-14, a document database 200-16, and Key/Value Store 200-15, considering that the property of data to be targeted is non-structural, and its relationship is important, and the temporal property is included, and it is necessary to perform a large volume of data processing of various types at a high speed. The model layer 200-03 can transparently be accessed to these databases.

In the present embodiment, "Matrix-type Access Control", "Graph Structured Log", "Event Correlation Calculation", "Version Control", "Trace and Tracking", "Analysis and Recognition", "Hypothesis, Assumption or Inference", "Time/Clock Management", "Clustering, Classification, and Prediction", and "Context Retrieval" are listed as an agreement graph operation 400-02, but not limited thereto. Part of these may be included, or another new computation may be added.

"Matrix-type Access Control" controls who to access and to which node it should be accessed. Persons belong to an organization, so it is necessary to change an access right due to the reassignment in the organization. When the access right after the reassignment in the organization is provided for a node generated prior to the reassignment in the organization, it is inconvenient in a case where the nodes are the assets of the former organization. The present computation is aimed at appropriately maintaining the relation of persons, the organization, and the nodes.

"Graph Structured Log" is designed for structuring log data based on the log model. The concrete example of the structuring will be described later.

"Event Correlation Calculation" is designed for computing the correlation (correlation) to consolidate a plurality of events associated. This reduces the number of events and improves the system performance.

"Version Control" is such that, when a node is modified, or when the structure of a node group is modified, a version is provided, thereby making it possible to access the node group of the version.

"Trace and Tracking" is designed for extracting a node group connected by tracing a link from a certain node or notifying a certain node of a connection with a new node.

"Analysis and Recognition" is designed for analyzing the connection between nodes or the structure of the node group and extracting the meaning of the nodes or the node group, for example, by referring to a meaning database or dictionary.

"Hypothesis, Assumption or Inference" is designed for deriving the property of analogous node group based on the structure of the node group or the correspondence of a meaning.

"Time/Clock Management" is designed for managing access time that includes generation, alteration, and deletion with regards to nodes and links or mapping the relative time.

"Clustering, Classification, and Prediction" is designed for classifying the node groups by use of hierarchical clustering, K-means technique, and the like.

"Context Retrieval" is designed for performing retrieval in consideration of context in the graph computation. For example, this is because, when there is a description regarding "a car", whether the description indicates the car or a person's name depends on the context.

Herein, the D-Case will briefly be described. The D-Case extends an assurance case (assurance case, ISO/IEC 15026-2: 2011) and is described by use of GSN (Goal Structuring Notation, http://www-users.cs.york.ac.uk/tpk/dsn2004.pdf) notation. The D-Case is utilized by the change accommodation cycle 100-01 and the failure response cycle 100-02 in the above-described DEOS process. For example, a model instance 400-04 is the example of an instance regarding the D-Case model 200-08. Also, a model instance 400-06 is the example of an instance regarding the consensus building model 200-09. The model instances 400-04 and 400-06 are respectively correlated with agreement nodes 400-07 and 400-09. The agreement node 400-07 is an agreement regarding the D-Case model instance 400-04 in which a plurality of nodes exist, and an agreement node 400-08 is an agreement regarding only a specific node. Thus, the subject of agreement may be not only a single node but also a plurality of node groups.

Figure 5A:
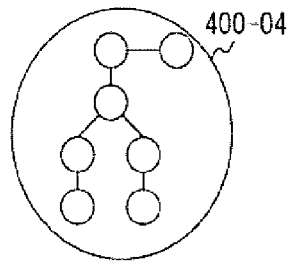
FIGS. 5(a)-(e) are diagrams illustrating an agreement graph in the present embodiment.
Figure 5B:
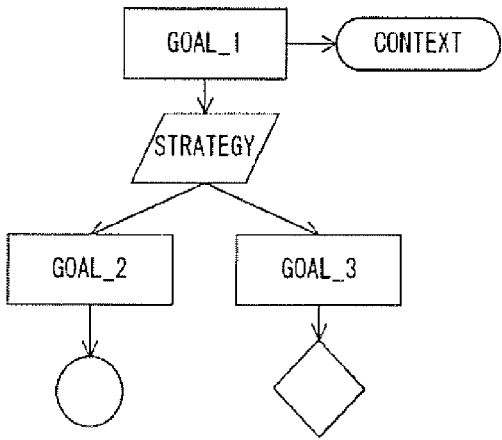
Figure 5C:
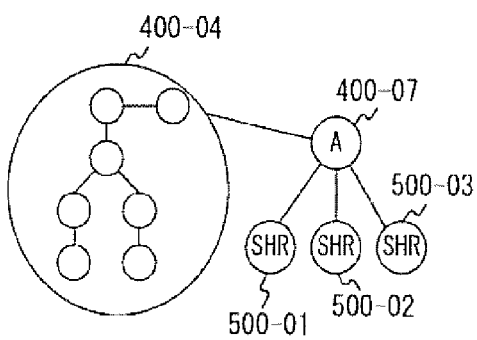

FIGS. 5(a)-(e) are diagrams illustrating an agreement graph in the present embodiment. FIG. 5(a) is the representation of the D-Case model instance 400-04, and it is assumed that its time is t1 . FIG. 5(b) is the D-Case at the time t1 corresponding to FIG. 5(a). When three stakeholders agree with D-Case of FIG. 5(b). the agreement node 400-07 illustrated in 5 FIG. 5(c) is correlated. Respective stakeholders are represented by model instances 500-01, 500-02, and 500-03 and correlated with the agreement node 400-07. A graph, which expresses the model instance agreed among these stakeholders, is referred to as an agreement graph.

Herein, D-Case notation will briefly be described. A rectangle represents a goal that needs to be proved through an argument. A round-corner square is context, and context information (supplementary information) regarding a node to be associated is described. A parallelogram represents strategy and indicates policy in a case where the argument is disassembled into sub goals. A circle represents evidence or monitoring and indicates basis regarding the goal associated. A rhombus indicates a node wherein an argument has not been made.

Figure 5D:
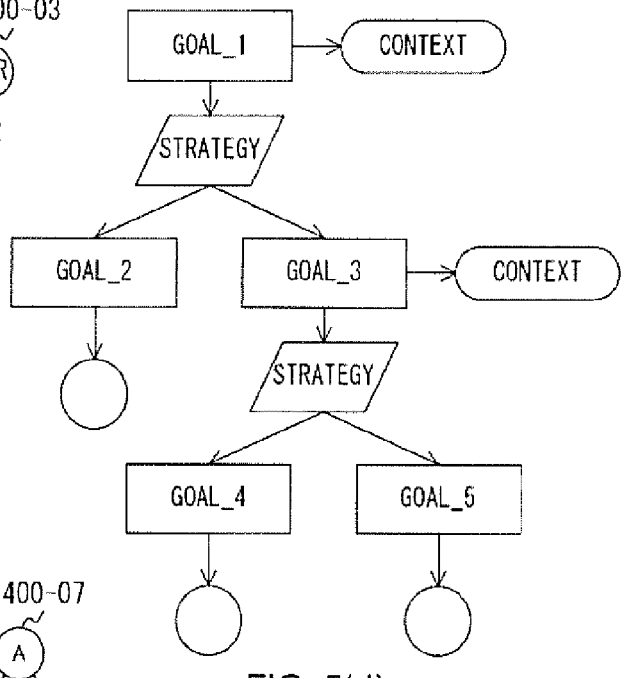
Figure 5E:
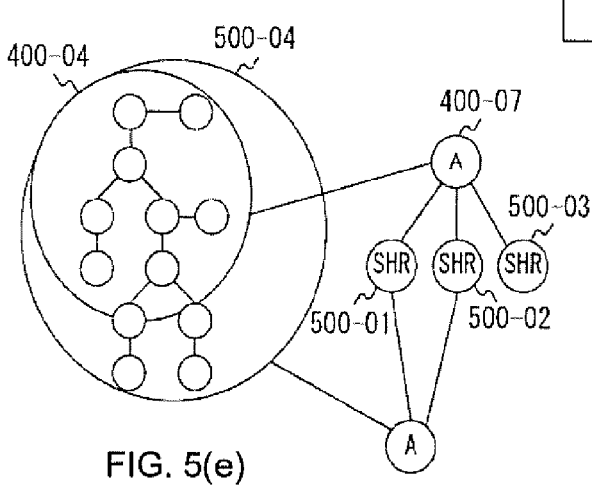

Next, it is assumed that the D-Case is modified from FIG. 5(b) to FIG. 5(d) at a time t2. A corresponding D-Case model is represented by a model instance 500-04. The agreement graph in a case where an agreement is made by two stakeholders 500-01 and 500-02 is exemplified in FIG. 5(e).

Figure 6:
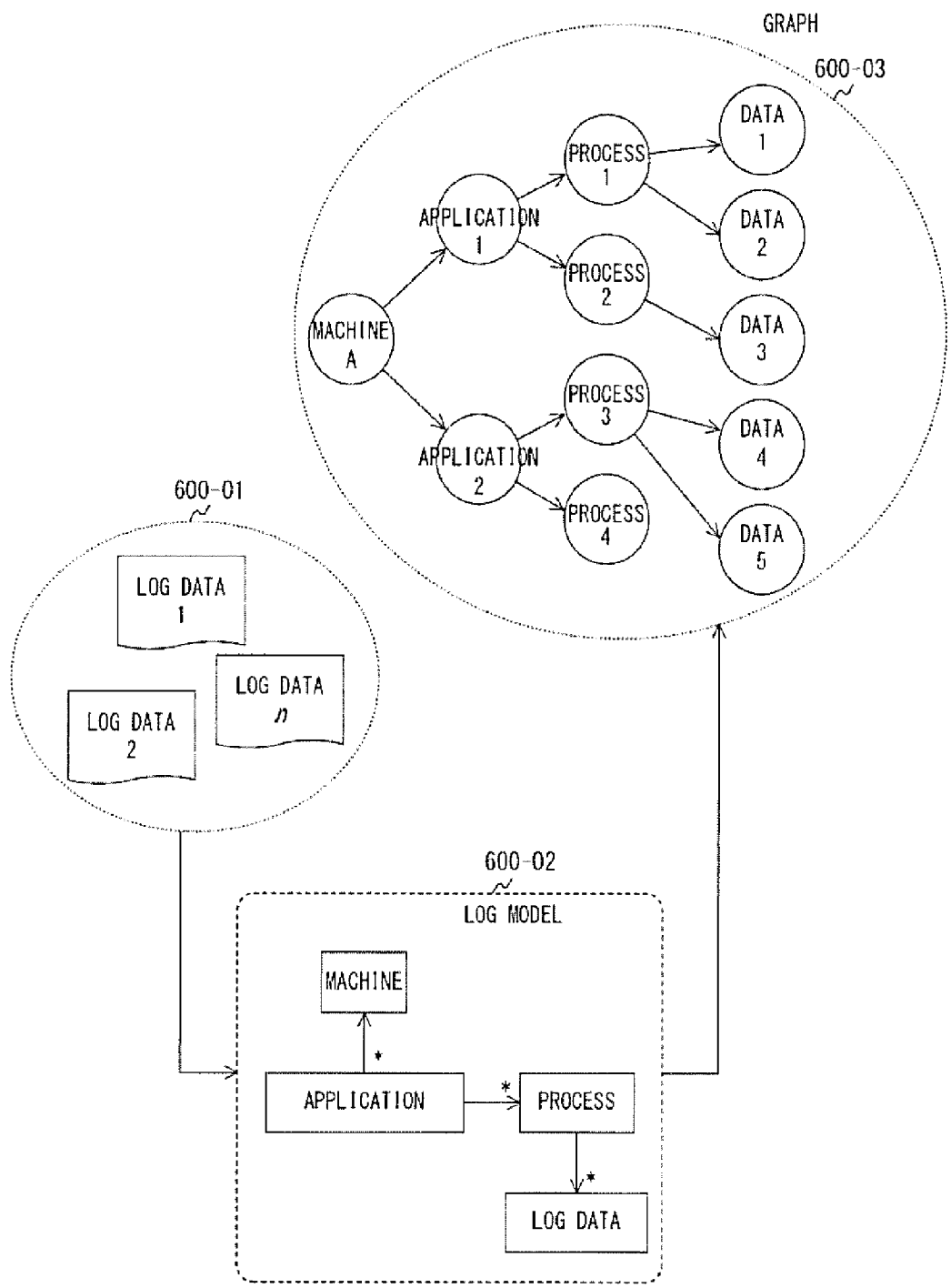
FIG. 6 is a diagram to describe a graph structured log with regards to the agreement graph computation of the present embodiment.

FIG. 6 is a diagram to describe the graph structured log with regards to the agreement graph computation of the present embodiment. A series of log data 600-01 is processed based on a log model 600-02, thereby being recorded with the structure of a graph 600-03 in the database layer 200-04. The log data 600-01 is recorded as non-structure data that generally does not have any structure or half-structure data in which part of the structure is defined or easily predictable. In the log model 600-02, a machine node corresponding to a machine's name, an application node corresponding to an application's name, a process node corresponding to a process's name, and a data node corresponding to log data are generated, and corresponding information is recorded. In the log model 600-02, a symbol "*" indicates that a plurality of instances can exist at an arrow destination with respect to one instance at an arrow source. The log data having the structure of the graph 600-03 is recorded in the database layer 200-04 by the graph structured log.

<Consensus Building Process>

Next, a consensus building process among the stakeholders by use of the dependability maintenance repository system 200-01 in the present embodiment will be described, centering on the consensus building support tool 200-05 according to the present embodiment. It is assumed that the consensus building support tool 200-05 is utilized in the consensus building process 100-03 in the DEOS process. Herein, the argument model of Toulmin is adopted but another method may be applied. For example, SACM (http:/www.omg.org/spec/SACM) defined by OMG (Object Management Group) may be used, or both may be combined.

Figure 7:
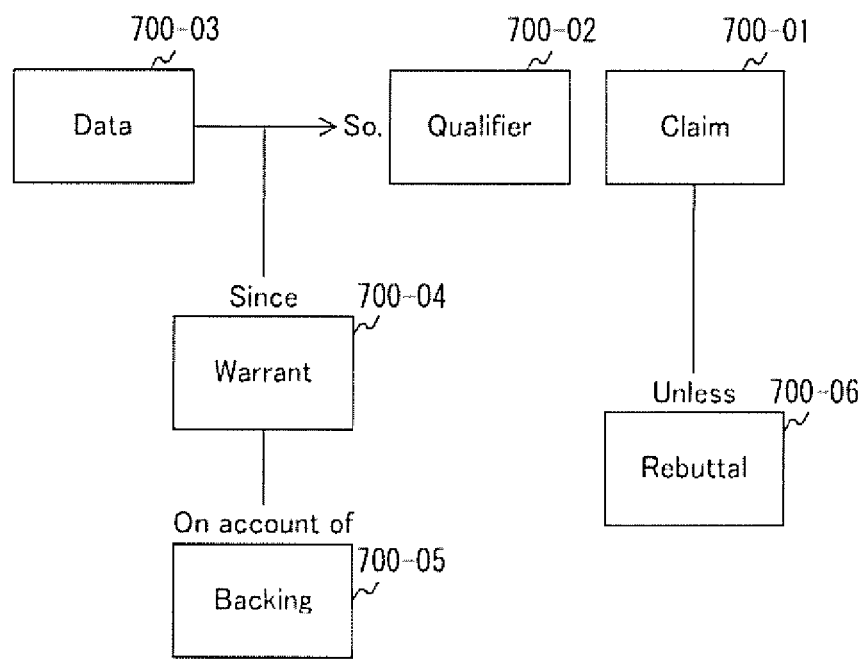
FIG. 7 is a diagram illustrating one example of an argument model proposed by Toulmin.

FIG. 7 is a diagram illustrating one example of the argument model proposed by Toulmin. In view of the argument, a speaker speaks in such a manner that the content of a speech of his own has a structure illustrated. A claim (claim 700-01 that is the conclusion of the argument, data (Data) 700-03 that substantiates the conclusion, and warrant (Warrant) 700-04 of the data with respect to the claim are considered. Regarding the warrant, a backing (Backing) 700-05 to substantiate the correctness of the warrant is required. Also, there is a case where the conclusion, which is the claim, is not complete, so that qualifier (Qualifier) 700-02 can be placed. In the argument, a rebuttal (Rebuttal) 700-06 to insist that this claim is not applied is considered. In fact, there exist the plurality of structures, which are associated with the plurality of speakers in a composite manner, thereby constituting the argument. The instance of this model is recorded in the database layer 200-04 as the above-described Toulmin model 200-10.

The UML class diagram of each model according to the present embodiment will be described referring to FIGS. 8 to 12. It is noted that, in the present embodiment, the UML class diagram is illustrated as one example of the embodiment, but not limited thereto. Herein, the UML class diagram will briefly be described. A square that is divided into two tiers represents class, and an upper tier is the name of class, and a lower tier is the name of attribute. A solid line from square to square is reference, and a name on an arrow is the name of attribute. At the tip of the solid line, "0 . . . n" represents multiplicity, which indicates that the number of preceding instances is 0 or n. A dotted-line arrow whose tip is outlined with a blank inside indicates the relation between super class and sub class.

Figure 8:
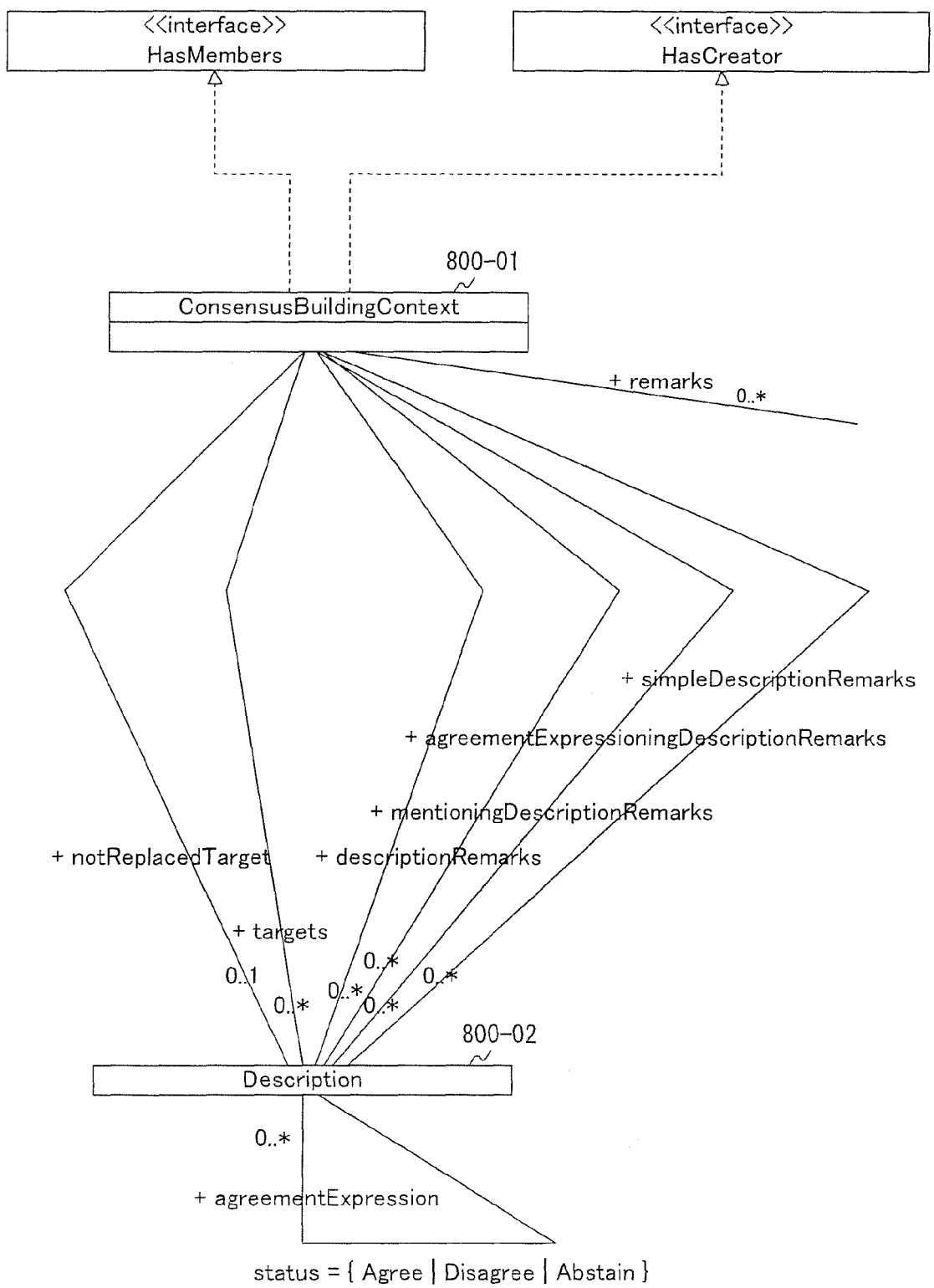
FIG. 8 is a diagram illustrating the example of UML description regarding a consensus building model 200-09 according to the present embodiment.

FIG. 8 is a diagram illustrating the example of UML description regarding the consensus building model 200-09 according to the present embodiment. Consensus building context (Consensus Building Context) 800-01 and a description (Description) 800-02 are defined as model instances. These model instances are recorded in the database layer 200-04 as nodes.

Figure 9:
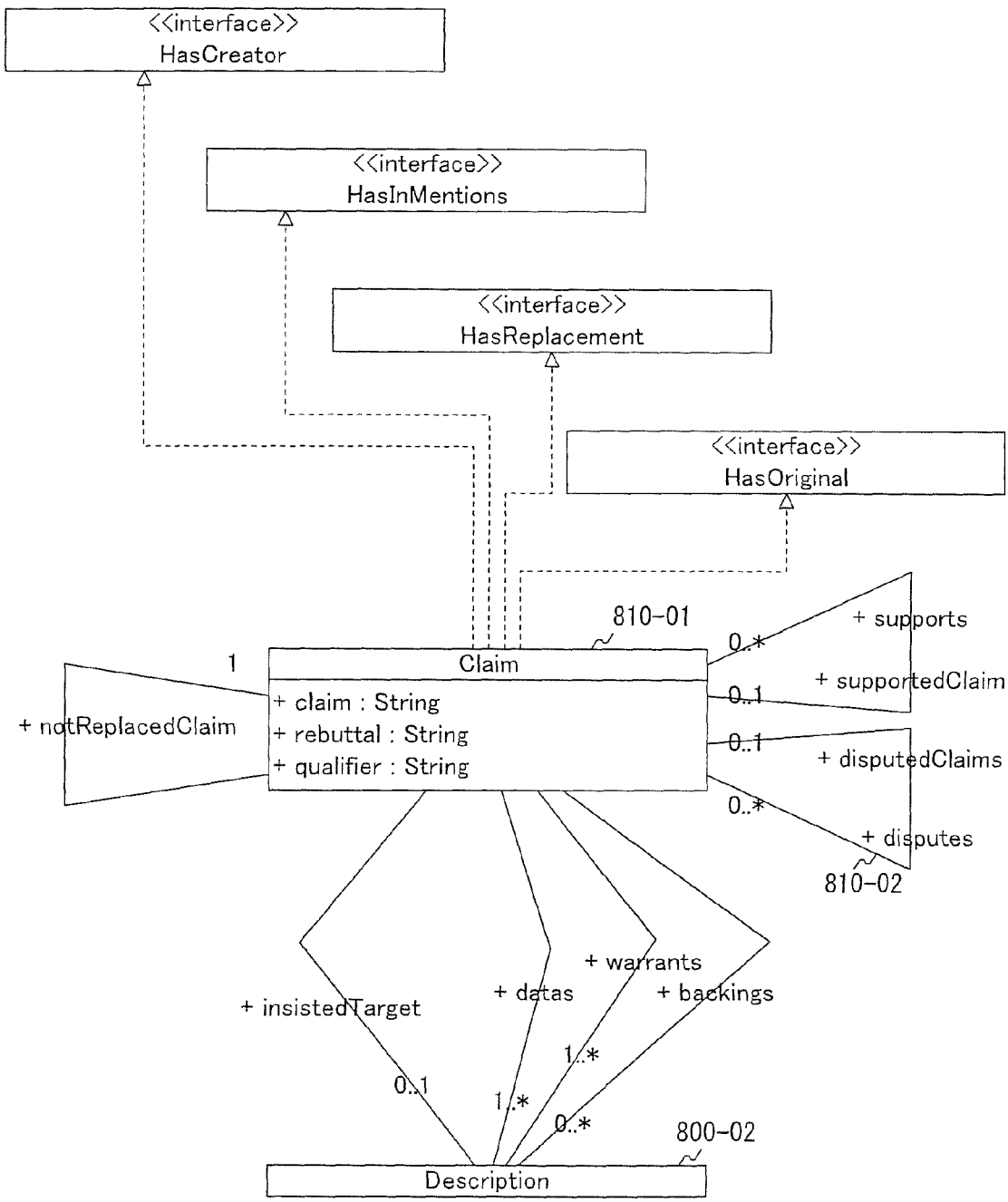
FIG. 9 is the example of the UML description regarding a Toulmin model 200-10 according to the present embodiment.

FIG. 9 is the example of UML description regarding the Toulmin model 200-10 according to the present embodiment. A claim (claim 810-01 and a description (Description) 800-02 are defined as the model instances. These model instances are recorded in the database layer 200-04 as nodes.

Figure 10:
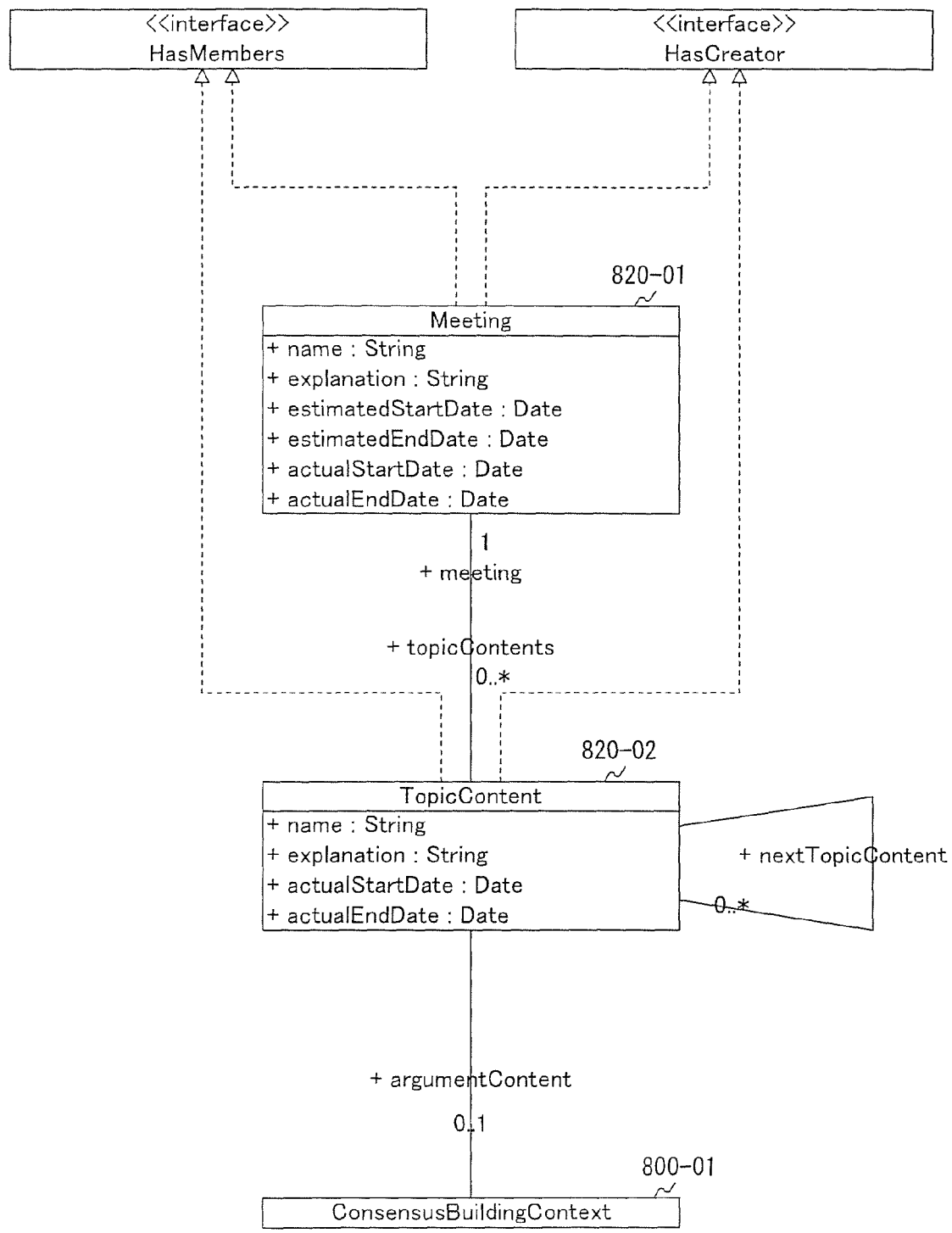
FIG. 10 is the example of the UML description regarding a meeting model 200-12 according to the present embodiment.

FIG. 10 is the example of UML description regarding the meeting model 200-12 according to the present embodiment. A meeting (Meeting) 820-01, a topic (Topic Content) 820-02, and the consensus building context (Consensus Building Context) 800-01 are defined as the model instances. These model instances are recorded in the database layer 200-04 as nodes.

Figure 11:
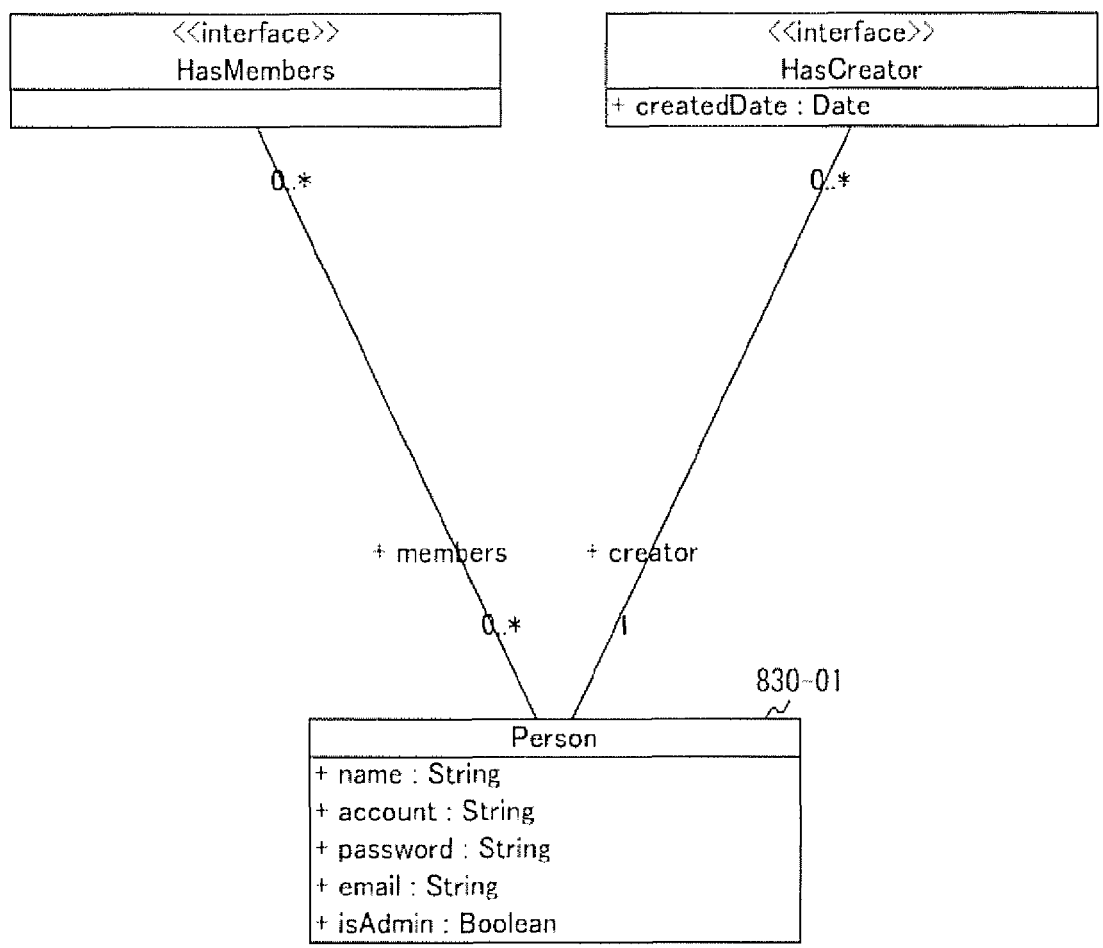
FIG. 11 is the example of the UML description regarding an organization model 200-11 according to the present embodiment.

FIG. 11 is the example of UML description regarding the organization model 200-11 according to the present embodiment. A person (Person) 830-01 is defined as the model instance. The model instance is recorded in the database layer 200-04 as a node.

Figure 12:
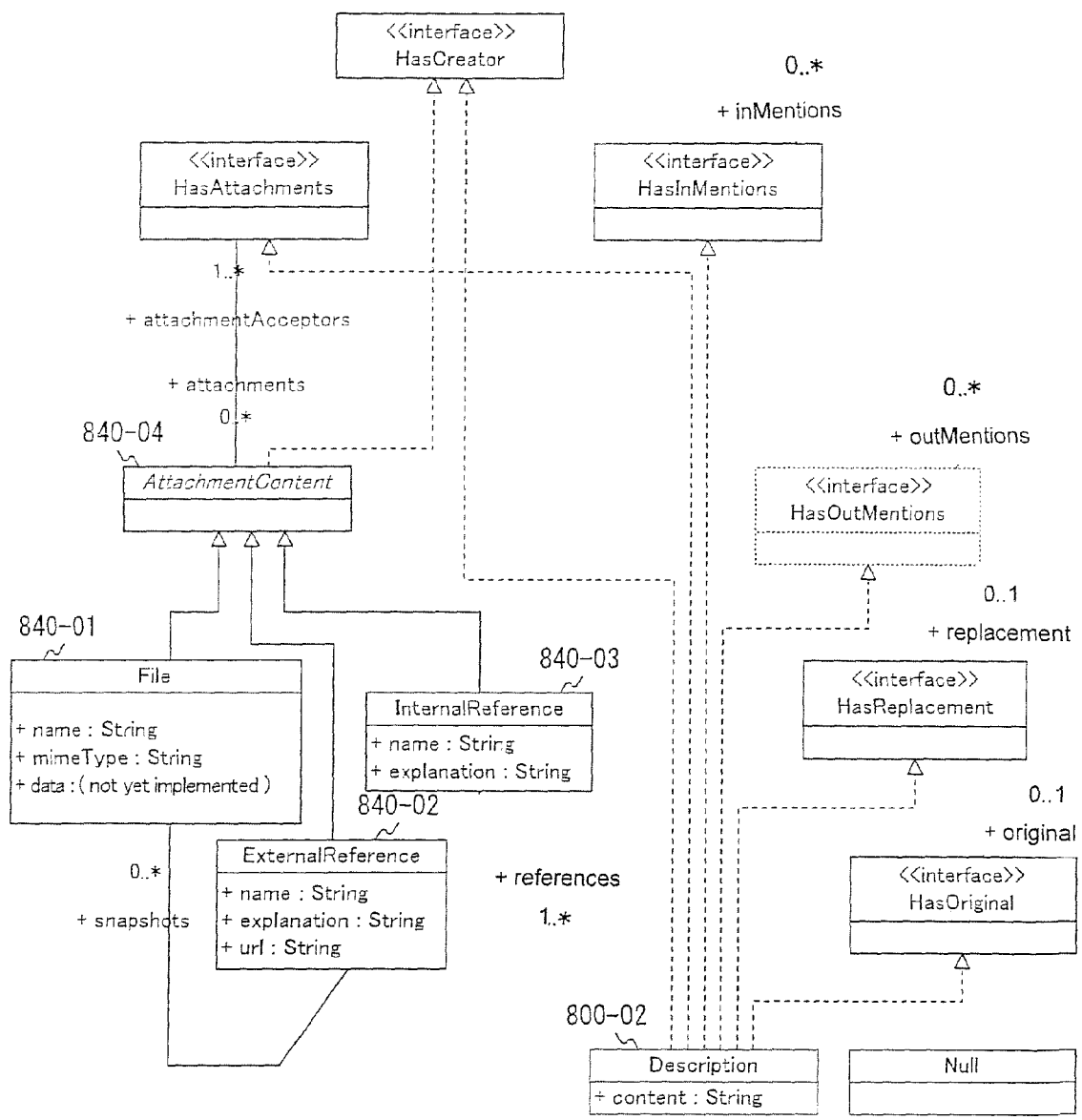
FIG. 12 is the example of the UML description regarding a basic data model 200-13 according to the present embodiment.

FIG. 12 is the example of UML description regarding the basic data model 200-13 according to the present embodiment. A file (File) 840-01, external reference (External Reference) 840-02, and internal reference (Internal Reference) 840-03 are defined as the model instances, and these are derived from an abstract class (Attachment Content) 840-04. Also, the description (Description) 800-02 is defined. This model instance group is recorded in the database layer 200-04 as nodes.

Figure 13:
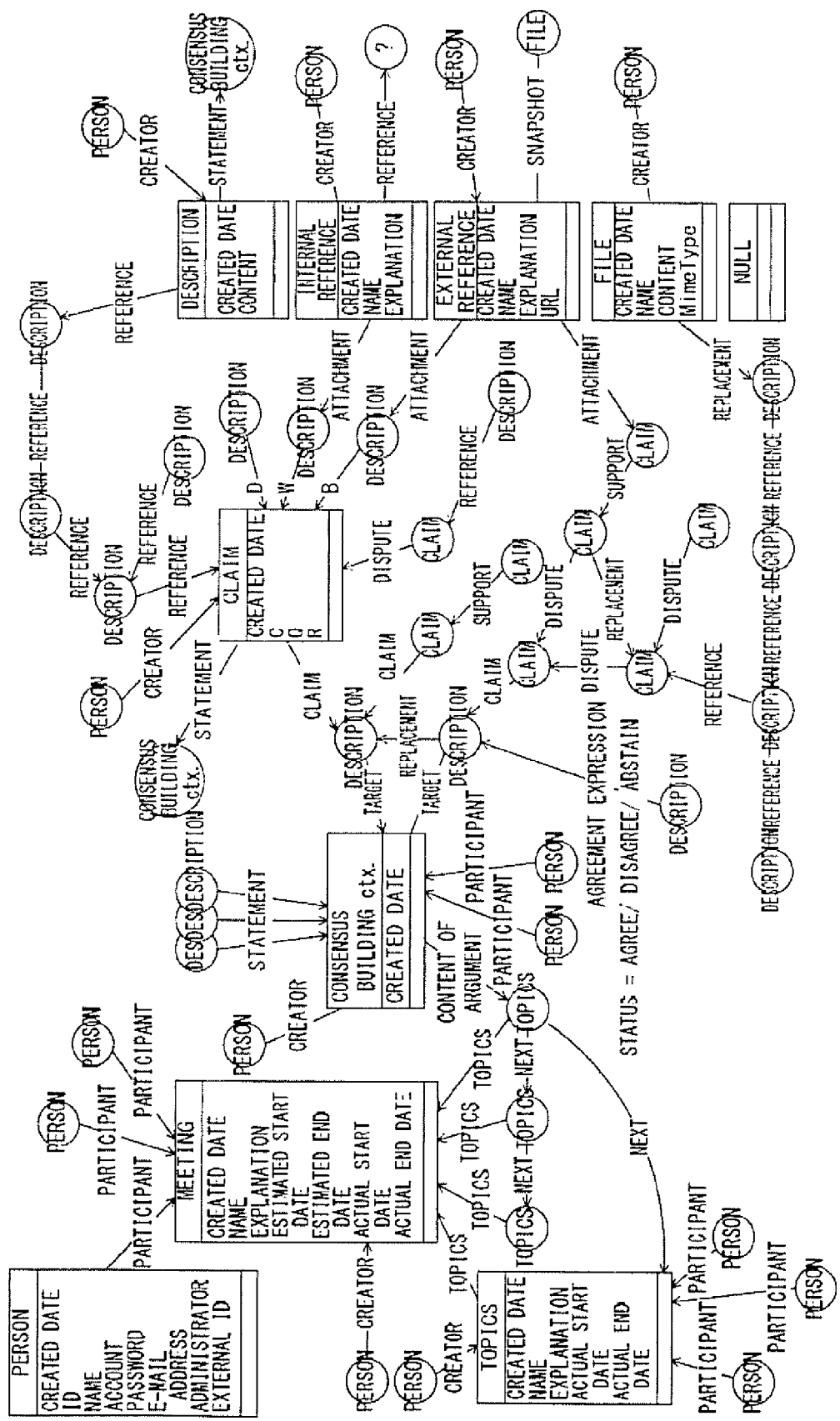
FIG. 13 is a diagram illustrating the overall picture of the model according to the consensus building in the present embodiment.

FIG. 13 is a diagram illustrating the overall picture of the model according to the consensus building in the present embodiment. First, "consensus building context" is defined as a place of consensus building. A plurality of "participants" and a plurality of "descriptions" are correlated with "consensus building context" as "statements". On the other hand, it is assumed herein that consensus is built in the form of meetings. "Meeting" model is defined, and the plurality of participants and "topics for discussion" are correlated. The plurality of "topics for discussion" are correlated with "consensus building context" as "argument content". In accordance with the above-described argument model, "descriptions" are correlated with "claims", and the relation of "reference" exists between "descriptions". The relation of "support" and "dispute" exists between "insistences". "Descriptions" and "claims" can be replaced by "replacing". Also, "descriptions" and "claims" can refer to "internal reference", "external reference", or "file" as "attachment". The relation between "descriptions" includes "agreement expression", and "agree", "disagree", or "abstain" are defined as its status. The consensus building support tool 200-05 records the process of the consensus building in the database layer 200-04 along with necessary associated information in accordance with the argument model proposed by Toulmin.

Figure 14:
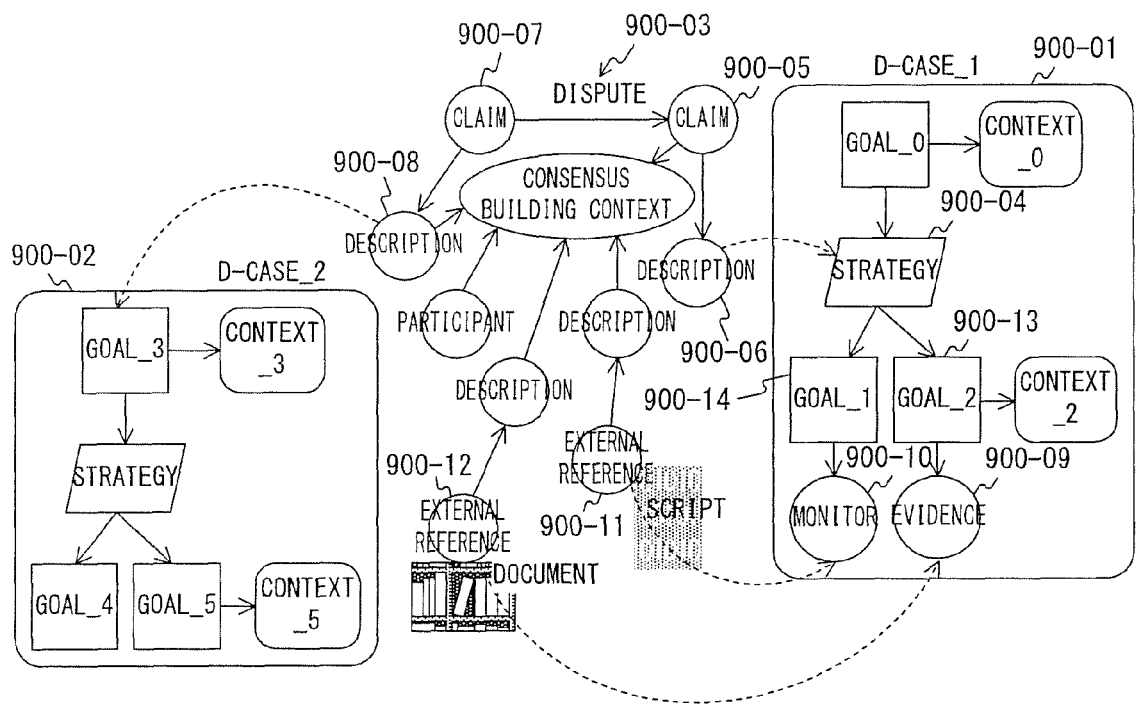
FIG. 14 is a diagram to describe the settings for the subject of an argument in the present embodiment.

FIG. 14 is a diagram to describe the settings for the subject of the argument in the present embodiment. The D-Case model 200-08 of the model layer 200-03 records an agreement graph wherein the tree structure in D-Case descriptive pattern (for example, see Non Patent Literature 3) is formed with vertices and edges. The consensus descriptive support tool 200-05 can freely set which portion is the subject of the argument with respect to the D-Case description.

For example, the argument with respect to the D-Case strategy node may be developed. In this case, the D-Case strategy node, a description node, and a claim node are linked as an agreement node. Also, the argument with respect to part of sub goals may be developed, and the argument with respect to the relation between the plurality of D-Cases may be developed. The argument regarding Strategy 900-04 in D-Case_1 (900-01) is recorded as a claim node 900-05 and a description node 900-06. In contrast, when D-Case_2 (900-02) is insisted as dispute, the node group of D-Case_2 (900-02) that is correlated with a claim node 900-07 and a description node 900-08 is recorded as a state where the node group is linked to the claim node 900-05 with the attribute of a dispute 900-03. The dispute 900-03 is a dispute link 810-02 in FIG. 9.

Also, an argument breakdown pattern is applied to the consensus building support tool 200-05, thereby efficiently handling the plurality of D-Cases to be targeted. The argument breakdown pattern classifies the policy, applied in the case where D-Case strategy breaks down into sub goals, into patterns such as system breakdown, functional breakdown, attribute breakdown, complete breakdown, monotonous breakdown, and concrete breakdown (see Non Patent Literature 3). For example, the system breakdown pattern, which is a pattern wherein the establishment of a goal is argued for each sub system constituting the system, handles the D-Case for each sub-system, so that a related agreement graph can also constitute an agreement for each sub-system.

Furthermore, a document 900-12 associated with a D-Case evidence node 900-09 is correlated, which serves as evidence that establishes a goal (900-13). It is noted that the document 900-12 is illustrated as a document, for example, stored in a document DB 200-16 via an external reference node. Also, a script 900-11 associated with a D-Case monitor node 900-10 is correlated, which serves as a monitor node that establishes a goal_1 (900-14). It is noted that the script 900-11 is illustrated as a script, for example, stored in a document DB 200-16 via an external reference node. Similarly, a reason and warrant that these documents are used are recorded in the database layer 200-04 as the process of the argument.

The D-Case represents an agreement among the stakeholders according to the dependability of the target system at a certain time and is static as the result of the argument at a time when the agreement has been made. On the other hand, in the open system according to the present embodiment, an agreement is inevitably corrected due to change in the environments. That is, the D-Case cannot be static in terms of the operation states of the system. When there occurs a deviation from the ordinary operation state 100-07, the D-Case needs to be corrected swiftly. Then, it is necessary to be capable of expressing what is argued and its details. The dependability maintenance repository system 200-01 according to the present embodiment provides a mechanism that enables it. For example, the corresponding meeting model instance is extracted from the agreement graph recorded in the database layer 200-04, and its link is traced by use "Trace and Tracking" mechanism of the agreement graph operation 400-02, thereby referring to past meeting data.

<Writing of Contract>

Figure 15:
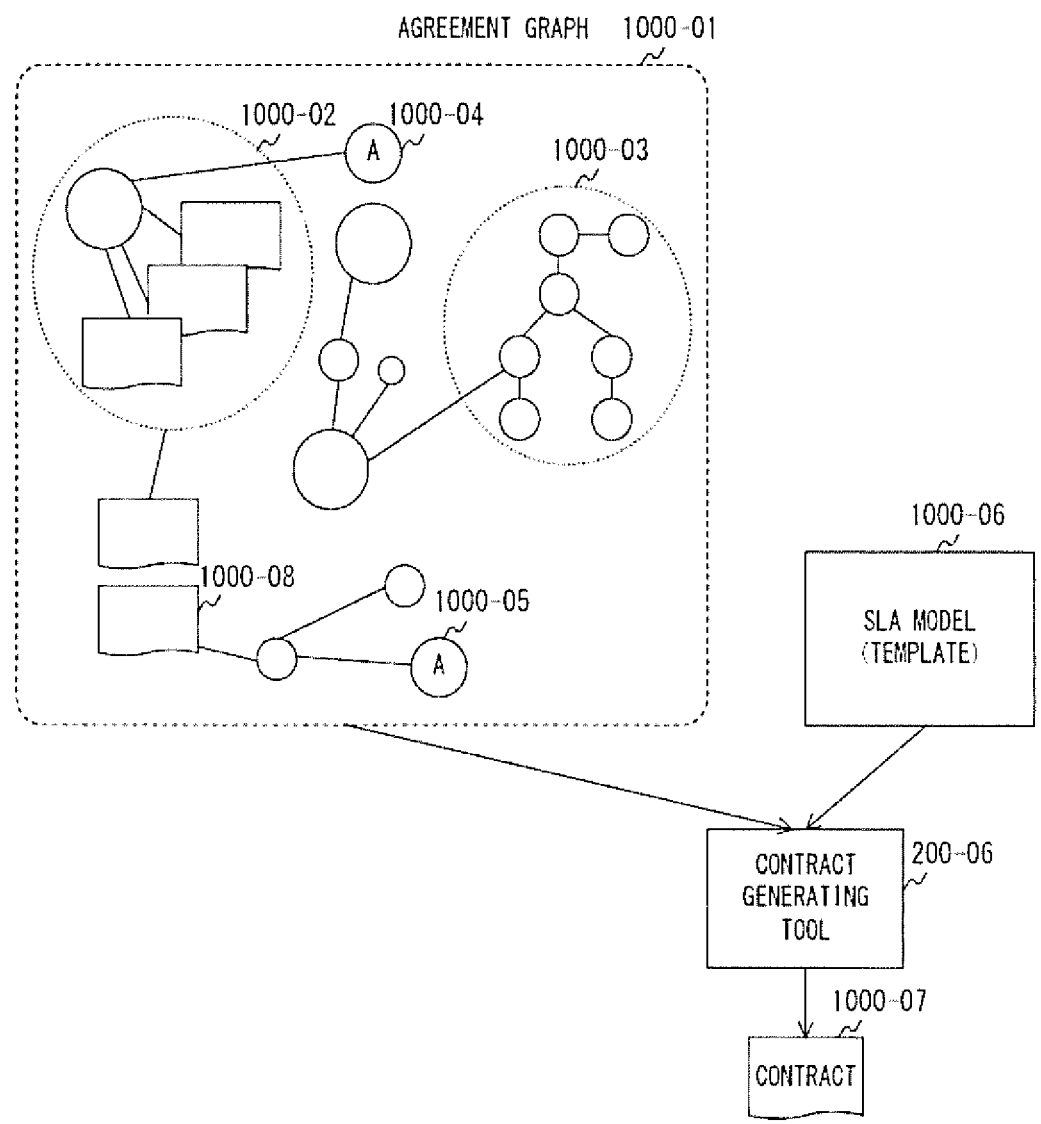
FIG. 15 is a diagram illustrating the outline of writing a contract according to the present embodiment.

FIG. 15 is a diagram illustrating the outline of writing a contract according to the present embodiment. The contract generating tool 200-06 provides a mechanism that writes a necessary contract regarding the target system 210-01 based on the information recorded in the dependability maintenance repository system 200-01. For example, SLA (Service Level Agreement) is an agreement regarding the content of services between a service provider and a recipient, a goal regarding the level of services, the extent of liability of the provider and the recipient, and the like. The dependability maintenance repository system 200-01 records an information source for the SLA.

The exemplification of part of the agreement graph recorded in the database layer 200-04 is assumed to be an agreement graph 1000-01. On the other hand, the SLA can define an SLA model 1000-06. The contract generating tool 200-06 extracts documents 1000-02 and 1000-08 correlated with nodes that are traceable based on agreement nodes 1000-04 and 1000-05 in the agreement graph 1000-01 in accordance with SLA model 1000-06 and generates a contract 1000-07.

<Monitoring>

The monitoring node tool 200-07 is associated with the D-Case monitor node (see Non Patent Literature 3) and includes a necessary mechanism to monitor the target system 210-01. For example, information on "what is the most efficient in terms of what to monitor and how long to monitor in the target system 210-01" serves as beneficial information in a case where monitoring regarding a similar system is designed. Also, the monitoring node tool 200-07 includes a necessary mechanism in order to present "Is the monitoring executed in accordance with the specification?" and "Does it satisfy the level of service agreed among the stakeholders?" on a real-time basis. A means of Patent Literature 1 may be applied to this mechanism, and another means may be applied.

Also, the monitoring node tool 200-07 deploys the script 900-11 in the model instance on the execution environment, so that the monitoring node tool 200-07 can comprehend that the target system is in the ordinary operation state 100-07 on a real-time basis. It is noted that, in FIG. 14, the script 900-11 is illustrated as a script, for example, stored in the document DB 200-16 via the external reference node. Also, as the execution environment, for example, a runtime computer in Patent Literature 1 can be assumed.

Furthermore, the monitoring node tool 200-07 is not limited to the monitoring of the target system 210-01, but may expand its subject in the use environment (organization operation) of the target system. In this case, the ordinary state of the organization operation is agreed among the stakeholders and recorded in the agreement graph as described above. Then, it is possible to avoid falling into an abnormal condition due to its deviation, or even when fallen into an abnormal condition, it is possible to swiftly restore the condition.

Figure 16:
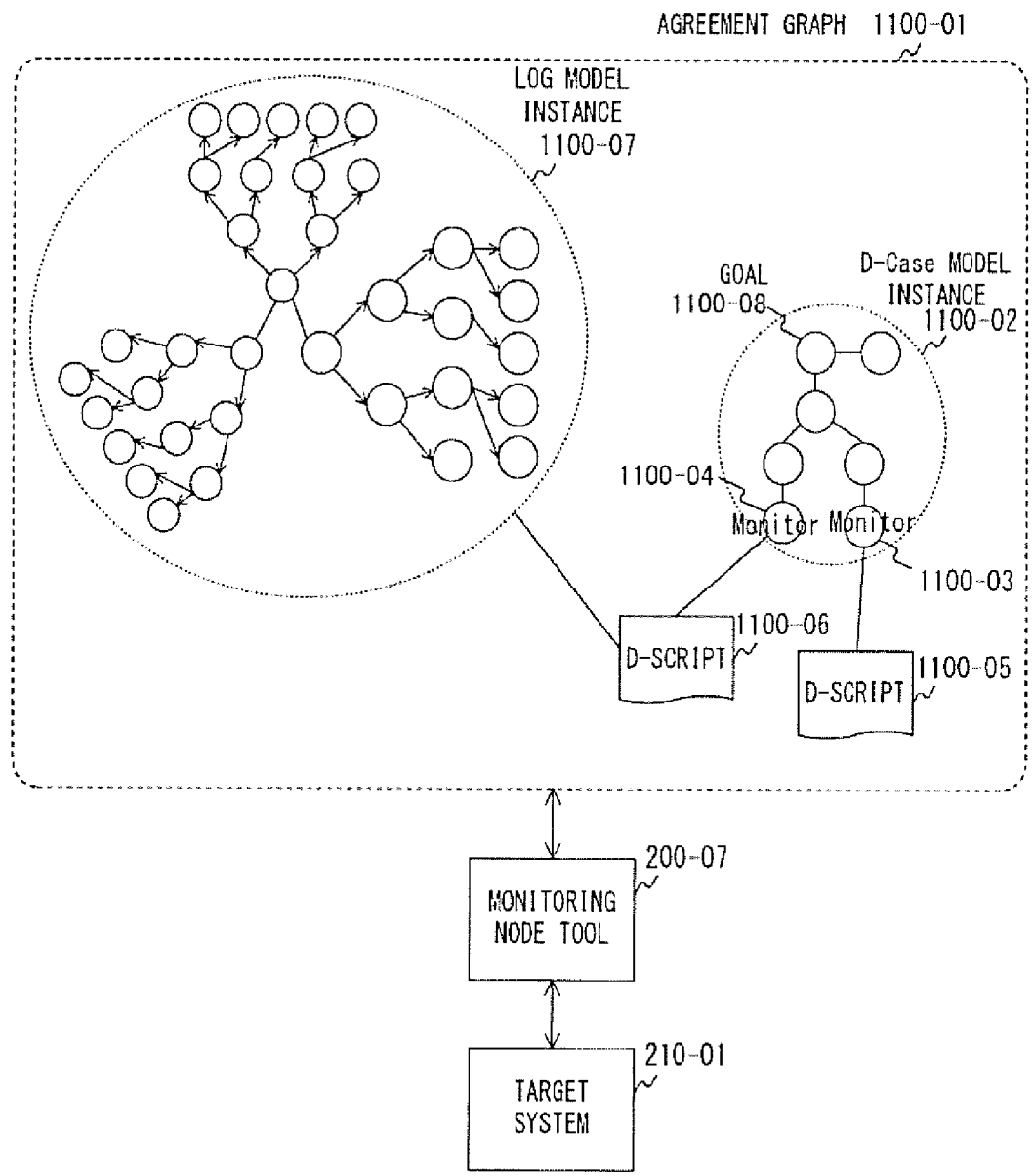
FIG. 16 is a diagram illustrating the relation of a monitoring node tool 200-07 and the agreement graph according to the present embodiment.

FIG. 16 is a diagram illustrating the relation of the monitoring node tool 200-07 and the agreement graph according to the present embodiment. In an agreement graph 1100-01, a D-Case model instance 1100-02 and a log model instance 1100-07 exist. Herein, the log model instance 1100-07 is the instance of the log model 600-02.

The monitoring node tool 200-07 extracts 0-Scripts 1100-05 and 1100-06 that are linked to monitoring nodes 1100-03 and 1100-04 in the D-Case model instance 1100-02. The 0-Script 1100-05 is deployed and executed in the target system 210-01, thereby obtaining the state of the monitoring node 1100-03. The D-Script 1100-06 is corresponded to the log model instance 1100-07, thereby obtaining the state of the monitoring node 1100-04. The monitoring node tool 200-07 determines the state of a goal 1100-08 based on the states of the monitoring nodes 1100-03 and 1100-04 in the D-Case instance 1100-02 and activates further action as needed.

Figure 17:
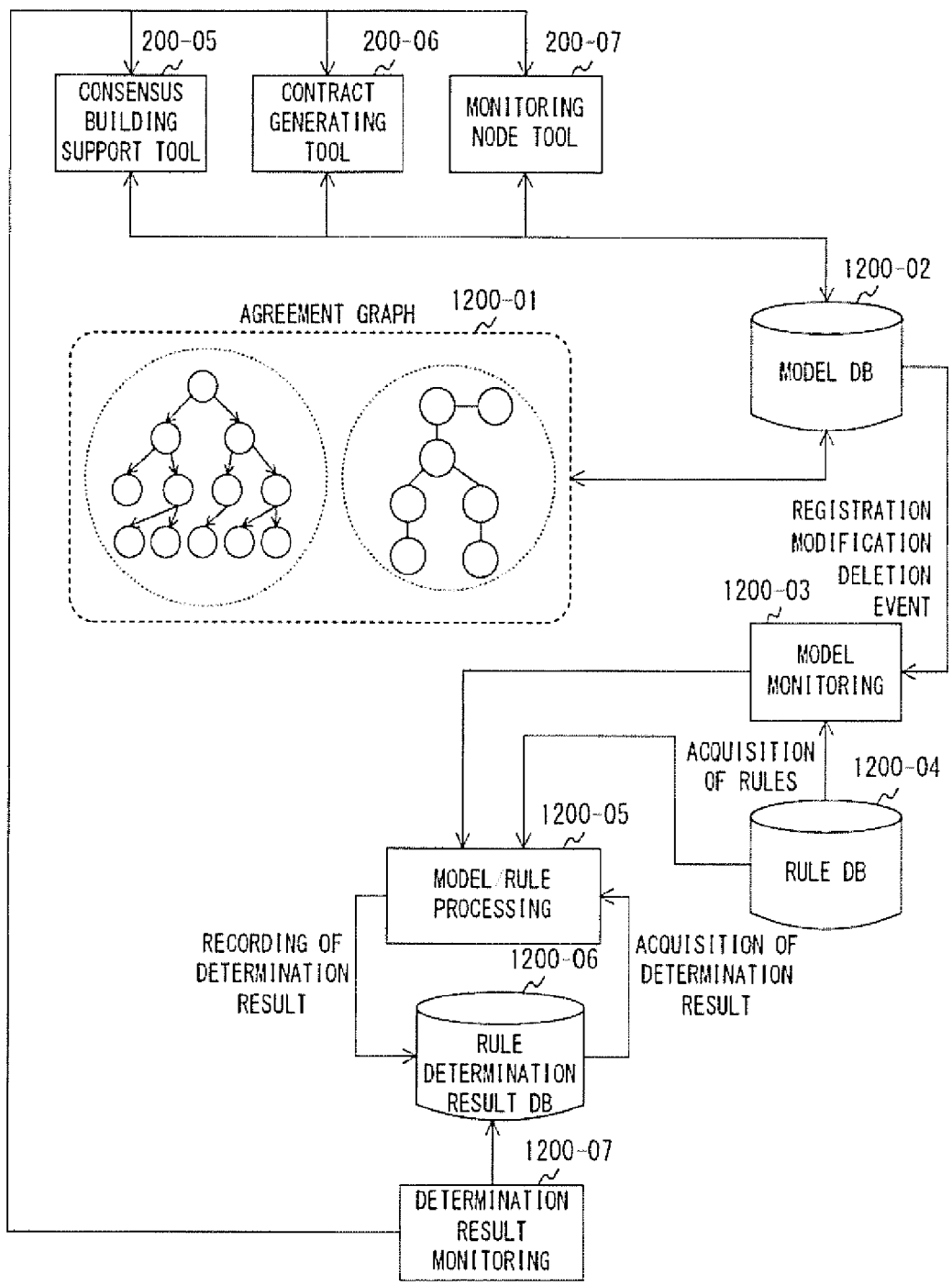
FIG. 17 is a diagram illustrating the relation of model monitoring and rules according to the present embodiment.

FIG. 17 is a diagram illustrating the relation of model monitoring and rules according to the present embodiment. In the diagram, the management of a model group that is handled by the tool group in the fundamental tool layer 200-02 according to the present embodiment will be described. The consensus building support tool 200-05, the contract generating tool 200-06, and the monitoring node tool 200-07 access an agreement graph 1200-01 as the model instance by use of a model DB 1200-02. In the model DB 1200-02, a model existed in the model layer 200-03 is recorded. The substance of the model DB 1200-02 exists in the document DB 200-16 of the database layer 200-04. However, regarding the relation between the models, its substance exists in the graph DB 200-14.

The relation between the models in the plurality of model groups existed in the model layer 200-03 is described based on rules. For example, with regards to a rule "one specification includes an association with a plurality of design specifications", although the one specification is produced, but when the design specifications associated do not exist, it is necessary to take some kind of action against the violation of rules. Also, as one example, with regards to a rule "the D-Case monitor node is associated with the results of these log verifications", when the results of log verifications corresponding to the D-Case monitor node do not exist, a necessary action is activated as the violation of the rule. It is noted that this rule may be described with the D-Script.

Similarly, in this rule, a rule regarding the time limitation on generation may be described. As one example, when a rule "it is necessary to generate this function by this time point" is provided, and when the function has not been generated by the time point, a necessary action is activated as the violation of the rule. Furthermore, in this rule, a rule that a value possessed by the model is confirmed may be provided, which is utilized in order to confirm the consistency between the models. These rule groups are generated on the assumption of the models.

The rule groups are recorded in a rule DB 1200-04. The substance of the rule DB 1200-04 exists in the document DB 200-16 of the database layer 200-04. A model monitoring 1200-03 monitors events such as the addition, modification, and deletion of the model to the model DB 1200-02, transmits a pair of model and rule to a model/rule processing 1200-05 in a case when the event group occurs, and executes the rule. The result of rule determination is recorded in a rule determination result DB 1200-06. The substance of the rule determination result DB 1200-06 exists in the document DB 200-16 of the database layer 200-04. The model/rule processing 1200-05 may obtain a related result from the rule determination result DB 1200-06 in the course of processing as needed. A determination result monitoring 1200-07 monitors the rule determination result DB 1200-06 and notifies the tool group of the fundamental tool layer 200-02 of the determination result. The model monitoring 1200-03, the model/rule processing 1200-05, and the determination result monitoring 1200-07 are managed by the monitoring node tool 200-07 and executed in the model layer 200-03.

<Example of System Implementation>

Figure 18:
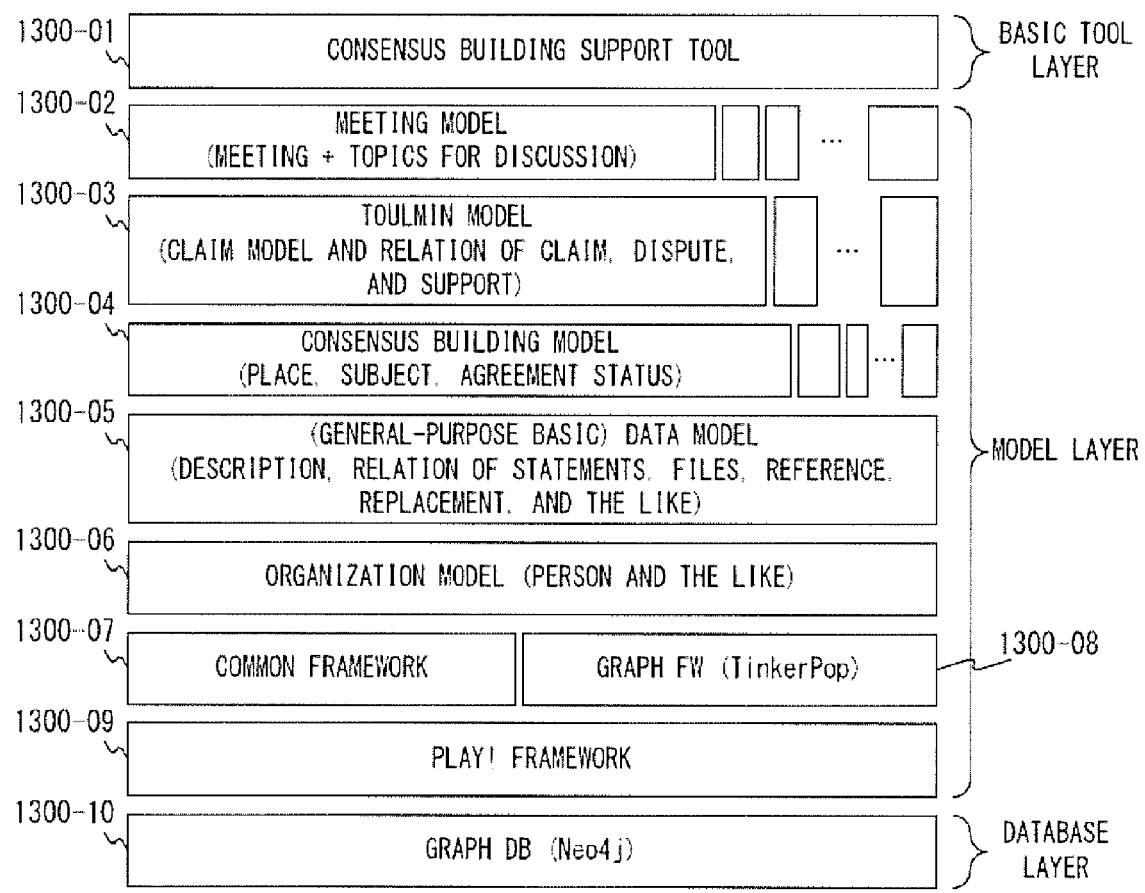
FIG. 18 is a diagram illustrating the example of the constitution of the implementation of the dependability maintenance repository system 200-01 according to the present embodiment.

FIG. 18 is a diagram illustrating the example of the constitution of the implementation of the dependability maintenance repository system 200-01 according to the present embodiment. The consensus building support tool 200-05 can be configured as a WEB application. In the fundamental tool layer 200-02, the consensus building support tool 200-05 exists (1300-01). In the model layer 200-03, there exist the meeting model 200-12 (1300-02), the Toulmin model 200-10 (1300-03), the consensus building model 200-09 (1300-04), the basic data model 200-13 (1300-05), and the organization model 200-11 (1300-06). The upper layer provides a necessary function for the consensus building support tool 1300-01 while utilizing the models in the lower layer.

In the example of the implementation, in the consensus building model 1300-04, "subject" to be agreed, "place" that defines the relation among the stakeholders, and "agreement status" therein are defined as models. It is noted that all the deliverables (outcome) to be agreed among the stakeholders, such as documents, programs, and scripts, are assumed as "subject" to be agreed.

In the Toulmin model 1300-03, claim, rebuttal, the relation of support, and necessary action are defined as edges in accordance with the above-mentioned model in FIG. 7.

In the meeting model 1300-02, the relation between the topics for discussion as well as the participants is defined. Each argument includes the progress of proceedings, the subject of an argument, claim against the subject, claim that supports claim, claim that disputes claim, a chain of statements against claim, and the agreement expression with respect to the subject. The meeting model is a model regarding an application and depends on the model in the lower layer. It is noted that these models may be made up of another model and can be replaced.

In the (general-purpose basic) data model 1300-05, the description, the relation of statements, files, reference, and replacement have been defined. An organization model 1300-

06 represents the relation of resources and organization, but in the example of the implementation, only the models regarding persons have been defined. Utilities required for these layers are provided from a common framework 1300-07, and the agreement graph is recorded in a graph database through a graph framework 1300-08. In the example of the implementation, open-source TinkerPop (http://tinkerpop.com) is adopted as the graph framework 1300-08, and open-source Neo4j (http://neo4j.org) is adopted as a graph database 1300-10. Also, Play! Framework (http://www.playframework.org) is adopted as an application server 1300-09. The Play! Framework includes a plug-in mechanism (module), so that a connection unit between the model group and the graph database is implemented as a module of the Play! Framework, and a consensus building support tool 1300-01 is implemented as a Play! application. Accordingly, in FIG. 18, the model layer is provided up to the Play! Framework.

Figure 19:
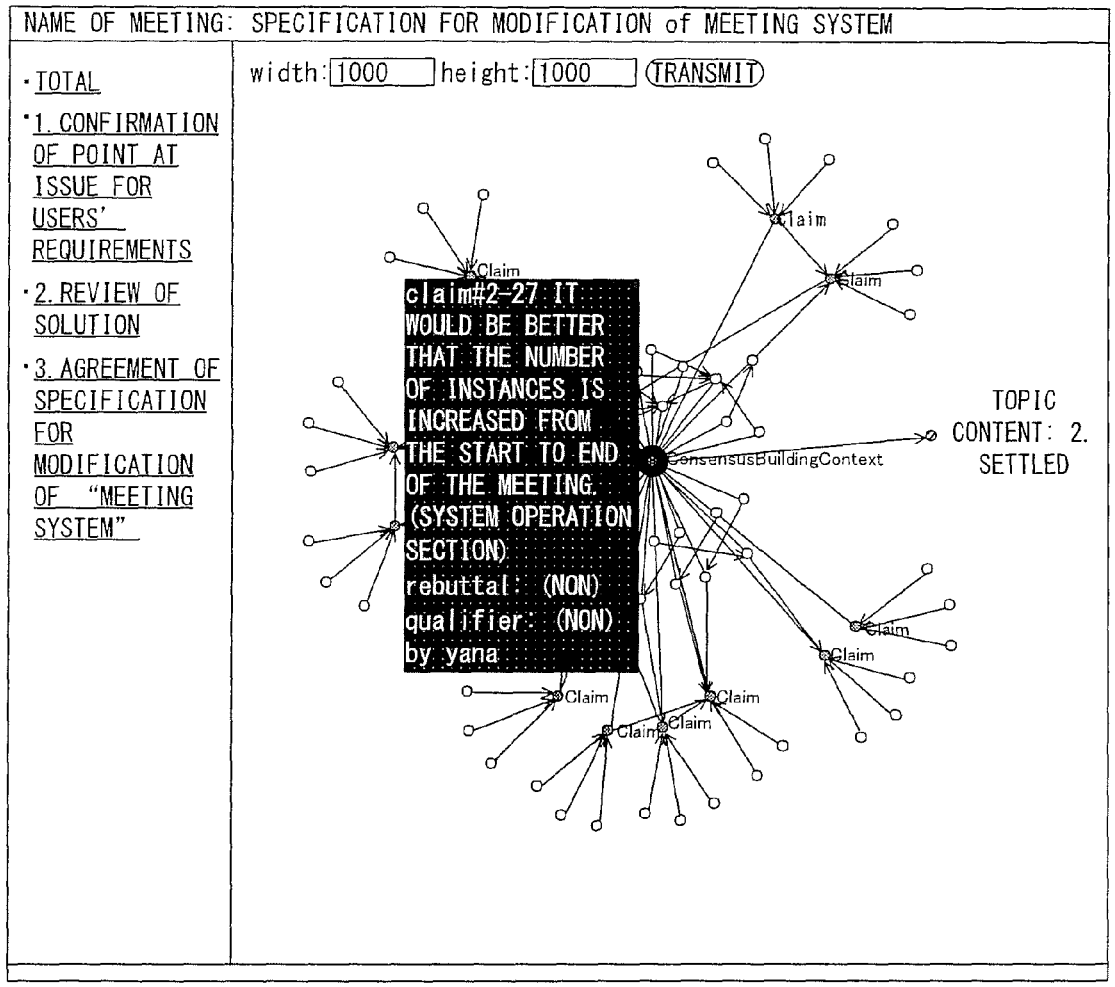
FIG. 19 is a diagram illustrating the display example with regards to the example of the implementation of the dependability maintenance repository system 200-01 according to the present embodiment.

FIG. 19 is a diagram illustrating the display example regarding the example of the implementation of the dependability maintenance repository system 200-01 according to the present embodiment. Herein, the agreement graph regarding the argument at a certain meeting is graphically displayed. The display example illustrates a scene in which the content of description pops up when a cursor is superimposed on the node.

<Entire Constitution>

Figure 20:
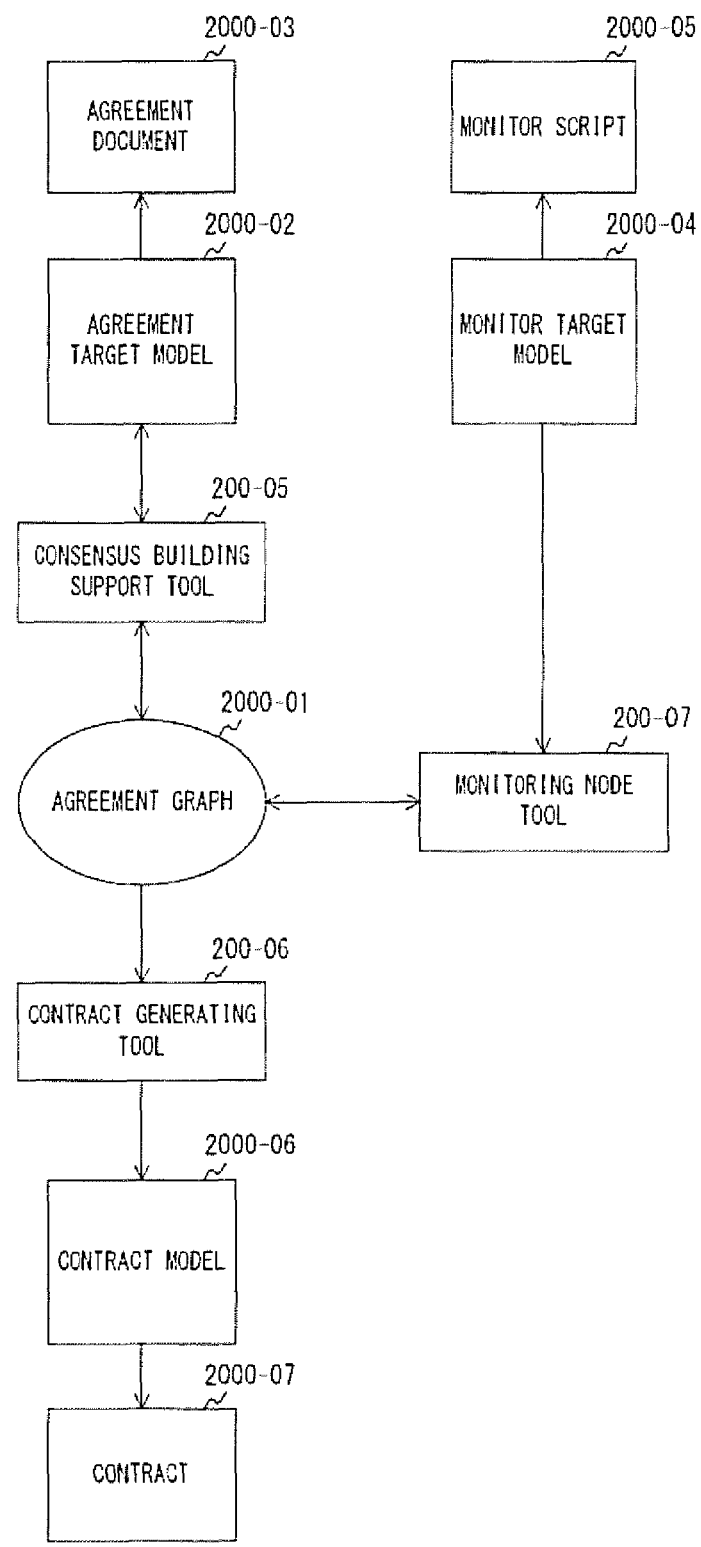
FIG. 20 is a diagram illustrating the example of the functional constitution of the dependability maintenance repository system 200-01 according to the present embodiment.

FIG. 20 is a diagram illustrating the example of the functional constitution of the dependability maintenance repository system 200-01 according to the present embodiment. In the example of the functional constitution, the consensus building support tool 200-05, the monitoring node tool 200-07, and the contract generating tool 200-06 are configured to access an agreement graph 2000-01.

The consensus building support tool 200-05 provides a support for consensus building through the argument regarding the ordinary operation state of the target system. The argument and an agreement document (document) 2000-03 required for the argument are targeted by the consensus building support tool 200-05. When the consensus building support tool 200-05 is used in the software development process of a computer system, a program code is assumed as the agreement document 2000-03. However, besides the computer system, the consensus building support tool 200-05 can be applied otherwise and can be applied to the meeting of a company, a general meeting of stockholders, a student council at school, and the like.

Then, the consensus building support tool 200-05 generates the agreement graph 2000-01 as a graph that expresses the model instance of an agreement target model 2000-02. This agreement graph 2000-01 is history obtained in the course of consensus building. This agreement graph 2000-01 is recorded in the database layer 200-04.

The monitoring node tool 200-07 detects a deviation from the ordinary operation state of the target system based on the actual operation state of the target system and the agreement graph 2000-01. The actual operation state of the target system is displayed as a monitor target model 2000-04. The actual systems such as servers and embedded systems are targeted by the monitoring node tool 200-07. A monitor script 2000-05 is illustrated as a script used in the monitor target model 2000-04.

The contract generating tool 200-06 extracts a contract model 2000-06 as one of information data regarding the consensus building based on the agreement graph 2000-01. A contract 2000-07 is generated in accordance with the contract model 2000-06. Herein, the example is illustrated wherein the contract is generated as one of information data regarding the consensus building, but another information data may be generated. For example, when the deviation from the ordinary operation state of the target system is detected by the monitoring node tool 200-07, the contract generating tool 200-06 generates information data upon the deviation as a trigger.

Figure 21:
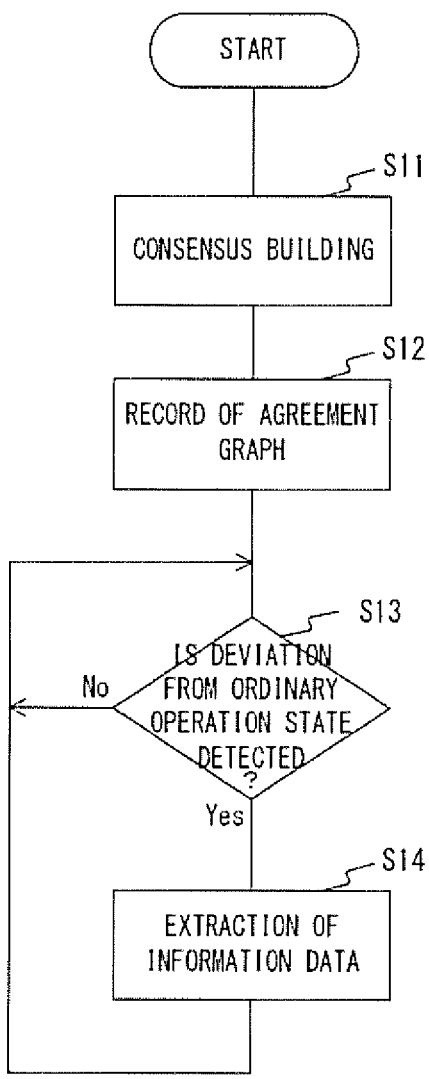
FIG. 21 is a flowchart illustrating the example of the procedure for processing in the dependability maintenance repository system 200-01 according to the present embodiment.

FIG. 21 is a flowchart illustrating the example of the procedure for processing in the dependability maintenance repository system 200-01 according to the present embodiment.

The consensus building is performed through the argument regarding the ordinary operation state of the target system (Step S11). The consensus building support tool 200-05 is used for the consensus building. History that is obtained in the process of the consensus building is recorded in the database layer 200-04 as the agreement graph (Step S12).

The actual operation state of the target system is monitored at all times. The monitoring node tool 200-07 refers to the actual operation state of the target system and the agreement graph, thereby monitoring whether or not there occurs the deviation from the ordinary operation state of the target system. Then, when the deviation from the ordinary operation state is detected (Step S13: Yes), the information data regarding the consensus building is extracted from the agreement graph (Step S14). As the information data regarding the consensus building, for example, the above-described contract is assumed.

Thus, according to the embodiments of the present invention, the history that is obtained in the process of the consensus building through the argument regarding the ordinary operation state of the target system is recorded as the agreement graph, and the operation state of the target system is monitored based on the agreement graph, thereby extracting the information data regarding the consensus building.

It is noted that the above-described embodiments are illustrated as one example in order to embody the present invention, and there is the correlation between matters in the embodiments and specific matters of the claims of the present invention. However, the present invention is not limited to the embodiments but can be embodied by applying various modifications to the embodiments without departing from the scope of the gist.

Reference Signs List

100-01 Change accommodation cycle
    100-02 Failure response cycle
    200-01 Dependability maintenance repository system
    200-02 Fundamental tool layer
    200-03 Model layer
    200-04 Database layer
    200-05 Consensus building support tool
    200-06 Contract generating tool
    200-07 Monitoring node tool

The invention claimed is:

1. A database system, comprising:
 a consensus building unit configured to provide a support for consensus building through an argument regarding an ordinary operation state of a target system;
 an agreement graph storing unit configured to store history obtained in a process of the consensus building as an agreement graph;
 a detecting unit configured to detect deviation from the ordinary operation state of the target system based on an actual operation state of the target system and the agreement graph; and
 an extracting unit configured to extract information data regarding the consensus building from the agreement graph when the deviation is detected in the target system.

2. The database system according to claim 1,
wherein the consensus building unit generates the agreement graph as a base with a plurality of models that define the target system, and
wherein the respective plurality of models uniquely define a meaning of a word regarding the target system, uniquely define an effect of an operation regarding the target system, and uniquely correlate logical definition with physical definition of data regarding the target system.

3. The database system according to claim 1, further comprising a document storing unit configured to correlate and store the agreement graph and a document regarding the target system generated through action of a plurality of stakeholders at plural stages constituting a life cycle of the target system.

4. The database system according to claim 1,
wherein the agreement graph is accessed in bilateral cycles, which are made up of a change accommodation cycle for continuously changing the target system with respect to an objective of the target system or a change in an environment and a failure response cycle for handling a failure in the target system.

5. A database system control method, comprising:
a consensus building procedure configured to provide a support for consensus building through an argument regarding an ordinary operation state of a target system;
an agreement graph storing procedure configured to store history obtained in a process of the consensus building as an agreement graph;
a detecting procedure configured to detect deviation from the ordinary operation state of the target system based on an actual operation state of the target system and the agreement graph; and
an extracting procedure configured to extract information data regarding the consensus building from the agreement graph when the deviation is detected in the target system.

* * * * *